(12) United States Patent
Marin et al.

(10) Patent No.: US 8,048,513 B2
(45) Date of Patent: *Nov. 1, 2011

(54) FLASH-SPUN SHEET MATERIAL

(75) Inventors: Robert Anthony Marin, Midlothian, VA (US); Larry R. Marshall, Chesterfield, VA (US); Barbara K. O'Rourke, Richmond, VA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/824,321

(22) Filed: Jun. 28, 2010

(65) Prior Publication Data

US 2010/0263108 A1    Oct. 21, 2010

Related U.S. Application Data

(63) Continuation of application No. 12/123,133, filed on May 19, 2008, now Pat. No. 7,744,989, which is a continuation of application No. 09/691,273, filed on Oct. 18, 2000, now abandoned.

(60) Provisional application No. 60/229,224, filed on Aug. 31, 2000, provisional application No. 60/160,021, filed on Oct. 18, 1999.

(51) Int. Cl.
  *B32B 27/32*  (2006.01)
  *B32B 27/00*  (2006.01)
  *B32B 37/00*  (2006.01)
  *D04H 1/00*   (2006.01)
  *D01H 5/253*  (2006.01)
  *B29C 47/88*  (2006.01)

(52) U.S. Cl. ............ 428/220; 428/299.7; 428/332; 428/212; 442/333; 264/171.21; 264/172.11; 264/211.12

(58) Field of Classification Search .......... 428/299.7, 428/332, 364, 365, 212, 220; 442/327, 333; 264/171.23, 171.21, 172.11, 211.12
See application file for complete search history.

(56) References Cited

U.S. PATENT DOCUMENTS

| | | | |
|---|---|---|---|
| 3,081,519 A | 3/1963 | Blades et al. |
| 3,169,899 A | 2/1965 | Steuber |
| 3,427,376 A | 2/1969 | Dempsey |
| 3,478,141 A | 11/1969 | Dempsey et al. |
| 3,532,589 A | 10/1970 | David |
| 4,091,137 A | 5/1978 | Miller |
| 5,023,130 A | 6/1991 | Simpson et al. |
| 5,081,177 A | 1/1992 | Shin |
| 5,123,983 A | 6/1992 | Marshall |
| 5,147,586 A | 9/1992 | Shin et al. |
| 5,192,468 A | 3/1993 | Coates et al. |

(Continued)

FOREIGN PATENT DOCUMENTS

| | | |
|---|---|---|
| EP | 0184932 | 6/1986 |
| WO | WO 96/20304 | 7/1996 |
| WO | WO 98/07905 | 2/1998 |
| WO | WO 98/07908 | 2/1998 |
| WO | WO 98/39509 | 9/1998 |
| WO | WO 98/44176 | 10/1998 |

*Primary Examiner* — Lynda Salvatore

(74) *Attorney, Agent, or Firm* — Woodcock Washburn LLP

(57) ABSTRACT

This invention relates to improved plexifilamentary sheet material useful in protective apparel and filtration media, which material is comprised of substantially continuous polyethylene plexifilamentary fiber strands and has a Frazier Permeability, normalized to 1.0 oz/yd$^2$ basis weight, of at least 2 cfm/ft$^2$.

64 Claims, 7 Drawing Sheets

U.S. PATENT DOCUMENTS

| | | |
|---|---|---|
| 5,290,628 A | 3/1994 | Lim et al. |
| 5,415,818 A | 5/1995 | Cloutier et al. |
| 5,707,468 A | 1/1998 | Arnold et al. |
| 5,919,539 A | 7/1999 | Bisbis et al. |
| 5,966,785 A | 10/1999 | Catallo |
| 6,010,970 A | 1/2000 | McGinty et al. |
| 6,034,008 A | 3/2000 | Lim et al. |
| 6,117,801 A | 9/2000 | McGinty et al. |
| 6,638,470 B2 | 10/2003 | Schweiger et al. |
| 2002/0004351 A1 | 1/2002 | Nobbee et al. |

FLASH-SPUN SHEET MATERIAL

CROSS REFERENCE TO RELATED APPLICATIONS

This application is a continuation U.S. Ser. No. 12/123,133, filed May 19, 2008, now U.S. Pat. No. 7,744,989, which is a continuation of U.S. Ser. No. 09/691,273, abandoned, filed Oct. 18, 2000 and claims benefit of priority from Provisional Application No. 60/160,021 filed on Oct. 18, 1999 and Provisional Application No. 60/229,224 filed on Aug. 31, 2000, the entireties of which are incorporated herein.

FIELD OF THE INVENTION

This invention relates to flash-spun plexifilamentary sheets or fabrics suited for protective apparel, air filtration, and other end use applications in which a sheet or fabric must demonstrate both good barrier properties and a high degree of breathability.

BACKGROUND OF THE INVENTION

Protective apparel includes coveralls, gowns, smocks and other garments whose purpose is either to protect a wearer against exposure to something in the wearer's surroundings, or to protect the wearer's surroundings against being contaminated by the wearer. Examples of protective apparel include suits worn in microelectronics manufacturing cleanrooms, medical suits and gowns, dirty job coveralls, and suits worn for protection against liquids or particulates. The particular applications for which a protective garment is suitable depends upon the composition of the fabric or sheet material used to make the garment and the way that the pieces of fabric or sheet material are held together in the garment. For example, one type of fabric or sheet material may be excellent for use in hazardous chemical protection garments, while being too expensive or uncomfortable for use in medical garments. Another material may be lightweight and breathable enough for use in clean room suits, but not be durable enough for dirty job applications.

The physical properties of a fabric or sheet material determine the protective apparel applications for which the material is suited. It has been found desirable for a wide variety of protective garment applications that the material used in making the protective garment provide good barrier protection against liquids such as body fluids, paints or sprays. It is also desirable that the material used in making protective apparel block the passage of fine dirt, dust and fiber particles. Another group of desirable properties for fabrics or sheet materials used in protective apparel is that the material have enough strength and tear resistance that apparel made using the sheet material not lose its integrity under anticipated working conditions. It is also important that fabrics and sheet materials used in protective garments transmit and dissipate both moisture and heat so as to permit a wearer to perform physical work while dressed in the garment without becoming excessively hot and sweaty. Finally, most protective garment materials must have a manufacturing cost that is low enough to make the use of the material practical in low cost protective garments.

A number of standardized tests have been devised to characterize materials used in protective garments so as to allow others to compare properties and make decisions as to which materials are best suited to meet the various anticipated conditions or circumstances under which a garment will be required to serve. The strength and durability of sheet materials for apparel have been quantified in terms of tensile strength, tear strength and elongation. The primary test used for characterizing liquid barrier properties is a test of resistance to passage of water at various pressures known as the hydrostatic head resistance test. Particulate barrier properties are measured by bacterial barrier tests and particle penetration tests.

Thermal comfort of fabrics and sheet materials has traditionally been presumed to correspond to the tested moisture vapor transmission rate (MVTR) of the material. However, MVTR is determined under static laboratory conditions, which measure vapor transported by molecular diffusion only. MVTR test results have not proved to be an entirely reliable means of predicting an apparel sheet material's comfort under actual dynamic workplace conditions. In a study of various apparel sheet materials conducted for DuPont by an independent testing laboratory, it was learned that a material's air permeability was the most reliable predictor of the relative comfort afforded by various fabric and sheet materials worn in protective garments. The significant contribution that air permeability makes to the thermal comfort of a garment appears to be due to motion induced pumping of air and moisture through the fabric or material. Because molecular diffusion of water vapor (measured by MVTR) is a relatively slow process, it appears that even small flows of moisture-laden air through a fabric or sheet material can have significantly more impact on moisture vapor transport through a material. Accordingly, it is important that sheet materials used in protective apparel have a high degree of air permeability without unduly sacrificing other important properties such as strength or barrier.

Porous sheet materials are also used in the filtration of gases where the filtration materials are used to remove dirt, dust and particulates from a gas stream. For example, air filters and vacuum cleaner bags are designed to capture dirt, dust and fine particulates while at the same time allowing air to pass through the filter. Porous sheet materials are also used in applications where it is necessary to filter out microbes such as spores and bacteria. For example, porous sheet materials are used in the packaging of sterile medical items, such as surgical instruments. In sterile packaging, the porous packaging material must be porous to gases such as ethylene oxide that are used to kill bacteria on items being sterilized, but the packaging materials must be impervious to bacteria that might contaminate sterilized items. Another application for porous sheet materials with good barrier properties is for making pouches that hold moisture absorbing desiccant substances. Such desiccant pouches are frequently used in packaged materials to absorb unwanted moisture.

The physical properties of a fabric or sheet material determine the filtration applications for which the material is suited. It has been found desirable for sheet materials used in a variety of filtration applications to provide good barrier to the passage of fine particles but also have good permeability to gases. Another set of desirable properties for fabrics or sheet materials used in certain filtration applications is that the material have enough strength and tear resistance that filters made using the sheet material will not lose their integrity under anticipated working conditions. Finally, most filter materials must have a manufacturing cost that is low enough to make the use of the material practical in low cost filters.

A number of standardized tests have been devised to characterize materials used in filtration and in sterile packaging so as to allow others to compare properties and make decisions as to which materials are best suited to meet the various anticipated conditions or circumstances under which a material will be required to serve. The strength and durability of sheet materials has been quantified in terms of tensile strength, tear strength and elongation. The primary tests used for characterizing filtration efficacy are tests that measure filter efficiency (% of particulates retained by a filter); the air permeability for air filters; the resistance to water flow through a filter at a given flow rate for liquid filters (also known as clean permeability); and life of a filter material under a given loading and operation condition (also known as capacity). Barrier properties can be measured by both bacterial or particulate barrier tests.

Tyvek® spunbonded olefin is a flash-spun plexifilamentary sheet material that has been in use for a number of years as a material for protective apparel. E. I. du Pont de Nemours and Company (DuPont) makes and sells Tyvek® spunbonded olefin nonwoven fabric. Tyvek® is a trademark owned by DuPont. Tyvek® nonwoven fabric has been a good choice for protective apparel because of its excellent strength properties, its good barrier properties, its light weight, its reasonable level of thermal comfort, and its single layer structure that gives rise to a low manufacturing cost relative to most competitive materials. DuPont has worked to further improve the comfort of Tyvek® fabrics for garments. For example, DuPont markets a Tyvek® Type 16 fabric style that includes apertures to improve breathability. DuPont has also produced water jet softened Tyvek® fabric (e.g., U.S. Pat. No. 5,023,130 to Simpson) that is softer and more opened up to enhance comfort and breathability. While both of these materials are indeed more comfortable, the barrier properties of these materials are significantly reduced as a consequence of their increased breathability.

In the early 1990's DuPont made a sheet from polyethylene fiber pulp which sheet was designed for use as a filtration media. This sheet was sold under the Hysurf™ mark and was made by a multiple step process disclosed in U.S. Pat. Nos. 5,047,121 and 5,242,546. According to the process, flash-spun polyethylene scrap material was first chopped up and refined to form a pulp. The pulp was mixed with water and surfactants to form a slurry which was then made into a sheet by a wet lay papermaking process. This sheet material was used in vacuum cleaner bags.

International Patent Publication Nos. WO 98/07905 and WO 98/07908 (both assigned to DuPont) disclose flash-spun plexifilamentary sheet material that demonstrates good barrier properties and improved breathability. A number of point bonded and softened plexifilamentary sheet materials disclosed in International Patent Publication No. WO 98/07908 exhibited a Gurley Hill Porosity of about 9 seconds in a sheet that also demonstrated a hydrostatic head of about 120 cm. A whole surface bonded plexifilamentary sheet disclosed in International Patent Publication No. WO 98/07905 had a Gurley Hill Porosity of about 3.6 seconds and a hydrostatic head of about 55 cm. However, a greater degree of breathability is desirable for apparel fabrics and a far greater degree of air permeability is required of sheets to be used as air filter media.

Gurley Hill Porosity is a measure of the number of seconds that it takes to pass a fixed quantity, of air maintained at a certain pressure, through a sheet. The lower the Gurley Hill Porosity (measured in seconds), the greater the air permeability of the material. The Gurley Hill Porosity scale is generally used to quantify the porosity of materials with relatively low air permeabilities. The air permeability of more porous materials is generally measured in terms of Frazier permeability, which measures the volume of air at a given pressure that will pass through a given area sheet material. For plexifilamentary sheet materials of less than 3 oz/yd$^2$, a Frazier Permeability of 2 ft$^3$/min/ft$^2$ corresponds to a Gurley Hill Porosity of about 3.1 seconds.

In order to provide more comfortable apparel fabrics and more breathable filters made from plexifilamentary sheet materials, there is a need for a plexifilamentary sheet material that demonstrates a Gurley Hill Porosity of less than 2 seconds while maintaining good liquid barrier properties. There is a need for a sheet material suitable for use in protective apparel that, at a given basis weight, has strength and barrier properties at least equivalent to that of the Tyvek® spunbonded olefin nonwoven fabric currently used for protective garments, but that also has significantly improved breathability to enhance the thermal comfort of protective apparel made of the material.

BRIEF DESCRIPTION OF THE DRAWINGS

The invention will be more easily understood by a detailed explanation of the invention including drawings. Accordingly, drawings which are particularly suited for explaining the invention are attached. However, it should be understood that these drawings are for explanation only and are not necessarily drawn to scale.

DEFINITIONS

Figure 1:
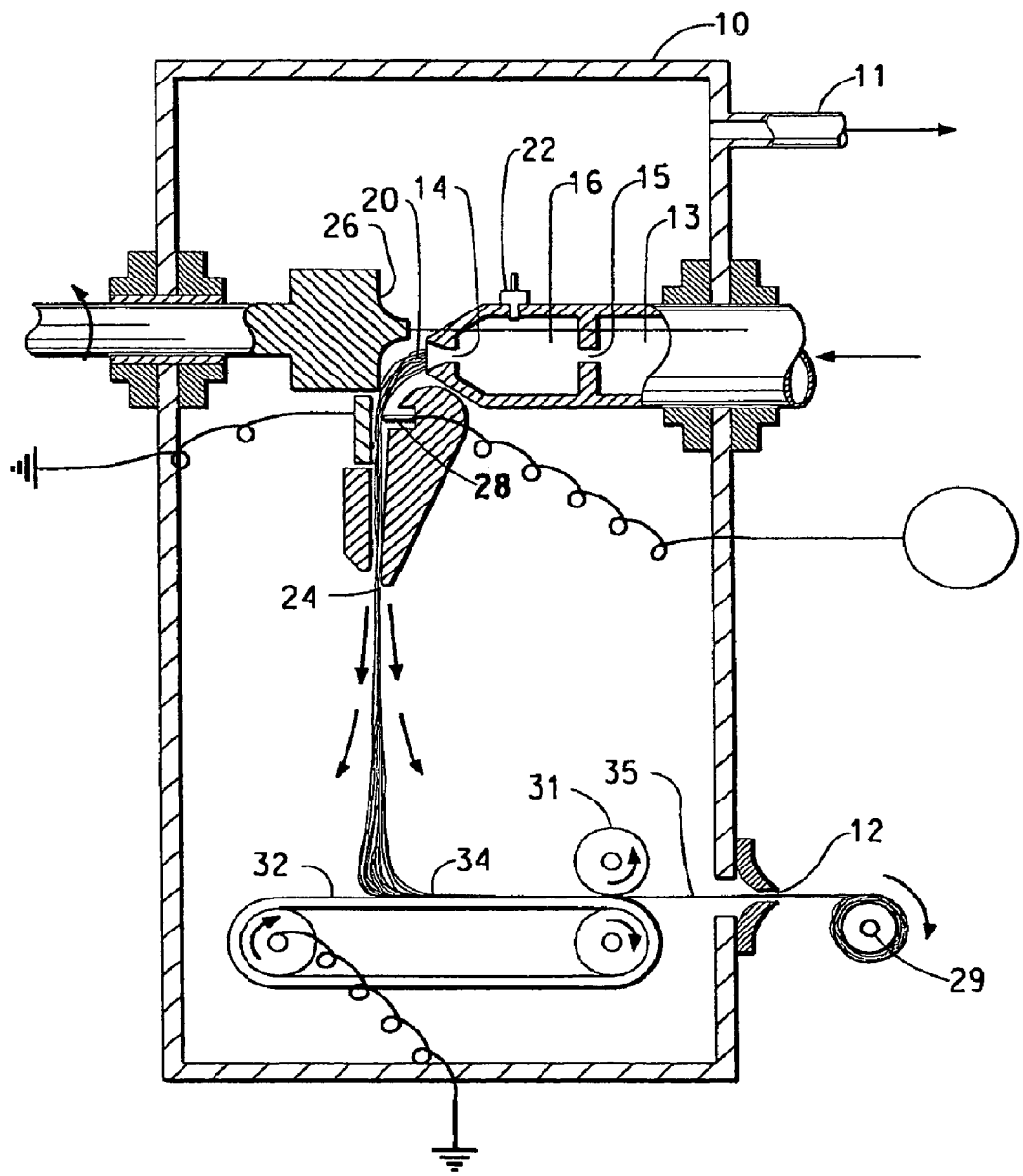
FIG. 1 a schematic cross sectional view of a spin cell illustrating a process for making flash-spun plexifilamentary sheets.

The term "polymer" as used herein, generally includes but is not limited to, homopolymers, copolymers (such as for example, block, graft, random and alternating copolymers), terpolymers, etc. and blends and modifications thereof. Furthermore, unless otherwise specifically limited, the term "polymer" shall include all possible geometrical configurations of the material. These configurations include, but are not limited to isotactic, syndiotactic and random symmetries.

The term "polyethylene" as used herein is intended to encompass not only homopolymers of ethylene, but also copolymers wherein at least 85% of the recurring units are ethylene units.

The term "nonwoven fabric, sheet or web" as used herein means a structure of individual fibers or threads that are positioned in a random manner to form a planar material without an identifiable pattern, as in a knitted fabric.

As used herein, the "machine direction" is the long direction within the plane of a sheet, i.e., the direction in which the sheet is produced. The "cross direction" is the direction within the plane of the sheet that is perpendicular to the machine direction.

The term "unitary fibrous sheet" as used herein, means woven or nonwoven fabrics or sheets made of the same types of fibers or fiber blends throughout the structure, wherein the fibers form a substantially homogeneous layer that is free of distinguishable laminations or other support structures.

The term "plexifilamentary" as used herein, means a three-dimensional integral network of a multitude of thin, ribbon-like, film-fibril elements of random length and with a mean film thickness of less than about 4 microns and a median fibril width of less than about 25 microns. In plexifilamentary structures, the film-fibril elements are generally coextensively aligned with the longitudinal axis of the structure and they intermittently unite and separate at irregular intervals in various places throughout the length, width and thickness of the structure to form a continuous three-dimensional network.

Test Methods

In the description, examples, and claims, the following test methods were employed to determine various reported characteristics and properties. ASTM refers to the American Society for Testing and Materials, AATCC refers to the American Association of Textile Chemists and Colorists, and IES refers to the Institute of Environmental Sciences.

The denier of the plexifilamentary strands were determined from the weight of a 180 cm sample length of web under a predetermined load of 250 g.

The surface area of the plexifilamentary film-fibril web product is another measure of the degree and fineness of fibrillation of the flash-spun product. Surface area is measured by the BET nitrogen absorption method of S. Brunauer, P. H. Emmett and E. Teller, J. Am. Chem. Soc., V. 60 p 309-319 (1938) and is reported as $m^2/g$.

Tenacity and elongation of the flash-spun webs were determined with an Instron tensile-testing machine. The strands were conditioned and tested at 70° F. (21° C.) and 65% relative humidity. The strands were then twisted to 10 turns per inch and mounted in the jaws of the Instron Tester. A two-inch gauge length was used with an initial elongation rate of 4 inches per minute. The tenacity at break is recorded in grams per denier (gpd). The elongation at break is recorded as a percentage of the two-inch gauge length of the sample. Modulus corresponds to the slope of the stress/strain curve and is expressed in units of gpd.

Crush values were determined using the following procedure: Three plexifilamentary fiber strands of different sizes were manually pulled from an unbonded plexifilamentary web. The three samples weighed about one, two and three grams. The reported crush values are the averages of the values measured on the three samples. Each sample plexifilamentary strand was formed into a ball shape with minimum application of pressure to avoid crushing and the sample was then weighed in grams. A crush tester comprised of an acrylic sample holder and crusher was used to measure the crush value of each sample. The sample holder comprised a cylindrical section having an inner diameter of 2.22 inches (5.64 cm) and an outer diameter of 2.72 inches (6.91 cm). The center of the cylinder was located at the geometric center of a square base measuring 6.00 inches by 6.00 inches (15.24 cm by 15.24 cm). The crusher comprised a cylindrical plunger rod (diameter =0.75 inches (1.91 cm)) having a first disk-shaped face (the disk having a thickness of 0.25 inches (0.64 cm) and a diameter of 2.20 inches (5.59 cm)) located at one end of the plunger rod and a second disk on the plunger rod spaced back 1.50 inches (3.81 cm) from the first disk. The second disk also had a thickness of 0.25 inches (0.64 cm) and a diameter of 2.20 inches (5.59 cm). The disks were sized slightly smaller than the inner diameter of the cylindrical sample holder in order to allow air to escape from the sample during crushing. The plexifilamentary samples were placed, one at a time, in the sample holder and a thin piece of paper having a diameter of about 2.2 inches (5.59 cm) was placed on top of the plexifilamentary sample prior to crushing. The plunger rod was then inserted into the cylindrical sample holder such that the first disk-shaped face contacted the piece of paper. The second disk served to maintain the axis of the plunger rod in alignment with the axis of the cylindrical sample holder. Each plexifilamentary strand sample was crushed by placing a 2 lb (0.91 kg) weight on the plunger rod. The crush height (mm) was obtained by measuring the height of the sample from the bottom of the cylindrical sample holder to the bottom of the crusher. The plunger and weight were removed from the sample after approximately 2 minutes, leaving the piece of paper in place to facilitate measurement of the restored height of the sample. Each sample was allowed to recover approximately 2 minutes and the restored height (mm) of the sample was obtained by measuring the height of the paper from the center of each of the four sides of the sample holder and averaging the measurements. The crush value (mm/g) is calculated by subtracting the average crush height from the average restored height and dividing by the average of the weights of the samples. The crush value is a measure of how much the sample recovers its original size after being crushed, with higher values indicating greater recovery of original sample height.

Basis Weight was determined by ASTM D-3776, which is hereby incorporated by reference, and is reported in $g/m^2$. The basis weights reported for the examples below are each based on an average of at least twelve measurements made on the sample.

Frazier Permeability is a measure of air permeability of porous materials and is reported in units of $ft^3/min$ per $ft^2$. It measures the volume of air flow through a material at a differential pressure of 0.5 inches water. An orifice is mounted in a vacuum system to restrict flow of air through sample to a measurable amount. The size of the orifice depends on the porosity of the material. Frazier permeability, which is also referred to as Frazier porosity, is measured using a Sherman W. Frazier Co. dual manometer with calibrated orifice units in $ft^3/ft^2/min$.

Gurley Hill Porosity is a measure of the permeability of the sheet material for gaseous materials. In particular, it is a measure of how long it takes a volume of gas to pass through an area of material wherein a certain pressure gradient exists. Gurley-Hill porosity is measured in accordance with TAPPI T-460 OM-88 using a Lorentzen & Wettre Model 121D Densometer. This test measures the time required for 100 cubic centimeters of air to be pushed through a 28.7 mm diameter sample (having an area of one square inch) under a pressure of approximately 1.21 kPa (4.9 inches) of water. The result is expressed in seconds that are frequently referred to as Gurley Seconds.

Moisture Vapor Transmission Rate (MVTR) was determined by ASTM E398-83 (which has since been withdrawn), which is hereby incorporated by reference. MVTR is reported in $g/m^2/24$ hr and is identified herein as "MVTR-LYSSY" data. Lyssy is based in Zurich, Switzerland.

ASTM E398-83 (the "LYSSY" method) is based on a pressure gradient of 85% relative humidity ("wet space") vs. 15% relative humidity ("dry space"). The LYSSY method measures the moisture diffusion rate for just a few minutes and under a constant humidity delta, which measured value, is then extrapolated over a 24 hour period.

Hydrostatic Head is a measure of the resistance of the sheet to penetration by liquid water under a static load. A 7 inch×7 inch (17.78 cm×17.78 cm) sample is mounted in a SDL 18 Shirley Hydrostatic Head Tester (manufactured by Shirley Developments Limited, Stockport, England). Water is pumped against one side of a 102.6 cm$^2$ section of the sample at a rate of 60 +/−3 cm/min until three areas of the sample are penetrated by the water. The hydrostatic pressure is measured in inches, converted to SI units and given in centimeters of water. The test generally follows ASTM D 583 (withdrawn from publication November, 1976).

Mullenburst was determined by TAPPI T403-85 and is reported in psi.

Air filtration collection efficiencies were measured using the method of ASTM F1215-89. Measurements were conducted on sheet samples measuring 8 inches by 8 inches (20.3 cm by 20.3 cm). All samples were tested at two different velocities (15 and 30 cm/sec) using 0.3 μm or 0.966 μm polystyrene latex spheres. The filtration efficiencies reported in the Examples are the average of three measurements made consecutively on three samples of the material being tested.

Pore size was measured in terms of mean flow pore size and bubble point according to the procedure of ASTM E1294 using a Capillary Flow Porometer manufactured by Porous Materials, Inc. The wetting fluid was a fluorocarbon oil with a surface tension of 16 dynes/cm. Measurements on the point-bonded sheets were made with the random bonded (smooth) side up. Mean flow pore size and maximum pore size (bubble point) are reported in microns (μm).

Handle-o-meter Stiffness measures a sample's resistance against being pressed into a 10 mm wide slot with a bar that is 2 mm thick and extends the full length of the sample being pressed into the slot. Handle-o-stiffness is an indicator of the softness of a sample. The Handle-o-Stiffness was measured with a Handle-O-Meter, Model No. 211-5, manufactured by Thwing Albert Instrument Company, of Philadelphia, Pa., USA. A square sample measuring 203 mm by 203 mm was cut from a sheet. The sample was centered over the slot in a manner such that substantially equal rectangular portions of the sample were on opposite sides of the slot. The direction of the sample being measured (e.g., the machine or cross direction) was aligned with the lengthwise direction of the slot. An edge of the bar was pressed against the sample so as to press the sample approximately 9 mm into the slot. The peak pressing force, measured in grams, was recorded. As one would expect, the stiffness of a sample tends to increase with basis weight. Thus, the stiffness can be normalized by multiplying the peak force by a factor equal to a basis weight of 1 g/m$^2$ divided by the actual basis weight. The stiffness measurements are also reported in grams.

Bonding Type Percent is a measure, made on a sheet with multiple bonded layers, that characterizes what portion of the sheet is bonded in each layer. For example, in a sheet that is point bonded on one side and whole surface bonded on the other side, the relative amounts of the sheet bonded by the two methods can be characterized. After the sheet has been bonded on both sides, the sheet's basis weight is measured. The sheet is delaminated by separating the layers of the sheet along one edge of the sample using a pick and then pulling the layers of the sample from each other. The basis weight of each layer is measured and then divided by the total basis weight of the sample and then multiplied by 100 to obtain the weight percent of the sample bonded by each method.

DETAILED DESCRIPTION OF ILLUSTRATIVE EMBODIMENTS

The process for making flash-spun plexifilamentary sheets, and specifically Tyvek® spunbonded olefin sheet material, was first developed more than twenty-five years ago and put into commercial use by DuPont. U.S. Pat. No. 3,081,519 to Blades et al. (assigned to DuPont), describes a process wherein a solution of fiber-forming polymer in a liquid spin agent that is not a solvent for the polymer below the liquid's normal boiling point, at a temperature above the normal boiling point of the liquid, and at autogenous pressure or greater, is spun into a zone of lower temperature and substantially lower pressure to generate plexifilamentary film-fibril strands. As disclosed in U.S. Pat. No. 3,227,794 to Anderson et al. (assigned to DuPont), plexifilamentary film-fibril strands are best obtained using the process disclosed in Blades et al. when the pressure of the polymer and spin agent solution is reduced slightly in a letdown chamber just prior to flash-spinning.

Flash-spinning of polymers using the process of Blades et al. and Anderson et al. requires a spin agent that: (1) is a non-solvent to the polymer below the spin agent's normal boiling point; (2) forms a solution with the polymer at high pressure; (3) forms a desired two-phase dispersion with the polymer when the solution pressure is reduced slightly in a letdown chamber; and (4) flash vaporizes when released from the letdown chamber into a zone of substantially lower pressure. Depending on the particular polymer employed, the following compounds have been found to be useful as spin agents in the flash-spinning process: aromatic hydrocarbons such as benzene and toluene; aliphatic hydrocarbons such as butane, pentane, hexane, heptane, octane, and their isomers and homologs; alicyclic hydrocarbons such as cyclohexane; unsaturated hydrocarbons; halogenated hydrocarbons such as trichlorofluoromethane, methylene chloride, carbon tetrachloride, dichloroethylene, chloroform, ethyl chloride, methyl chloride; alcohols; esters; ethers; ketones; nitriles; amides; fluorocarbons; sulfur dioxide; carbon dioxide; carbon disulfide; nitromethane; water; and mixtures of the above liquids. Various solvent mixtures useful in flash-spinning are disclosed in U.S. Pat. No. 5,032,326 to Shin; U.S. Pat. No. 5,147,586 to Shin et al.; and U.S. Pat. No. 5,250,237 to Shin (all assigned to DuPont).

The general flash-spinning apparatus chosen for illustration of the present invention is similar to that disclosed in U.S. Pat. No. 3,860,369 to Brethauer et al., which is hereby incorporated by reference. A system and process for flash-spinning a fiber-forming polymer is fully described in U.S. Pat. No. 3,860,369, and is shown in FIG. 1. The flash-spinning process is normally conducted in a chamber 10, sometimes referred to as a spin cell, which has a spin agent removal port 11 and an opening 12 through which non-woven sheet material produced in the process is removed. A spin fluid, comprising a mixture of polymer and spin agent, is provided through a pressurized supply conduit 13 to a spinning orifice 14. The spin fluid passes from supply conduit 13 to a chamber 16 through a chamber opening 15. In certain spinning applications, chamber 16 may act as a pressure letdown chamber wherein a reduction in pressure causes phase separation of the spin fluid, as is disclosed in U.S. Pat. No. 3,227,794 to Anderson et al. A pressure sensor 22 may be provided for monitoring the pressure in the chamber 16.

The spin fluid in chamber 16 next passes through spin orifice 14. It is believed that passage of the pressurized polymer and spin agent from the chamber 16 into the spin orifice generates an extensional flow near the approach of the orifice that helps to orient the polymer. When polymer and spin agent discharge from the orifice, the spin agent rapidly expands as a gas and leaves behind fibrillated plexifilamentary film-fibrils. The gas exits the chamber 10 through the port 11. Preferably, the gaseous spin agent is condensed for reuse in the spin fluid.

The polymer strand 20 discharged from the spin orifice 14 is conventionally directed against a rotating deflector baffle 26. The rotating baffle 26 spreads the strand 20 into a more planar web structure 24 that the baffle alternately directs to the left and right. As the spread web descends from the baffle, the web is electrostatically charged so as to hold the web in a spread open configuration until the web 24 reaches a moving belt 32. The web 24 deposits on the belt 32 to form a batt 34. The belt is grounded to help insure proper pinning of the charged web 24 on the belt. The fibrous batt 34 may be passed under a roller 31 that compresses the batt into a lightly consolidated sheet 35 formed with plexifilamentary film-fibril networks oriented in an overlapping multi-directional configuration. The sheet 35 exits the spin chamber 10 through the outlet 12 before being collected on a sheet collection roll 29.

The sheet 35 is subsequently run through a finishing line which treats and bonds the material in a manner appropriate for its end use. For example, the sheet product may be bonded on a smooth heated roll as disclosed in U.S. Pat. No. 3,532,589 to David (assigned to DuPont) in order to produce a hard surface bonded sheet product. According to this bonding process, both sides of the sheet are subjected to generally uniform, full surface contact thermal bonding. The "hard structure" product has the feel of slick paper and is used commonly in envelopes, construction membrane materials such as Tyvek® Homewrap™, and sterile packaging material. Whole surface bonded "hard structure" material is unlikely to be used in apparel applications due to its paper-like feel and lack of drape.

For apparel applications, the sheet 35 is typically point bonded and softened as disclosed in U.S. Pat. Nos. 3,427,376, 3,478,141, and 4,091,137 (each assigned to DuPont) to produce a "soft structure" product with a more fabric like feel. The intent with point bonding is to provide closely spaced bonding points with unbonded fiber therebetween in an aesthetically pleasing pattern. DuPont prefers a point bonding pattern according to which the sheet is contacted by thermal bonding rolls with undulated surfaces that give rise to portions of the fabric having very slight thermal bonding while other portions are more clearly subjected to bonding. After the fabric sheet is bonded, it may be subjected to mechanical softening to remove hardness that may have been introduced during bonding. This improves the feel and tactile qualities of the fabric.

Historically, the preferred spin agent used in making Tyvek® flash-spun polyethylene has been the chlorofluorocarbon (CFC) spin agent, trichlorofluoromethane (FREON®-11). FREON® is a registered trademark of DuPont. When FREON®-11 is used as the spin agent, the spin solution has been comprised of about 12% by weight of polymer with the remainder being spin agent. The temperature of the spin solution just before flashing has historically been maintained at about 180° C.

It has now been found that it is possible to flash-spin lower surface area plexifilamentary fibers that, when laid down and bonded, make a fabric or sheet that is significantly more permeable than flash-spun plexifilamentary fabrics or sheets produced at conventional polymer concentrations and spin temperatures, and with at least equivalent strength and barrier properties. This more air permeable material has been found to have great utility in protective garments and filtration products where increased air permeability significantly improves product performance.

Applicants have found that improved sheet permeability can be attained, when polyethylene is flash-spun from a hydrocarbon spin agent at spinning temperatures higher than have conventionally been used in flash-spinning processes. Applicants have found that when polyethylene is flash spun from a spin agent that is a blend of normal pentane and cyclopentane at such higher spin temperatures, plexifilamentary fiber strands can be made that have a much lower surface area and are far less cohesive than known polyethylene plexifilamentary fiber strands. Importantly, when these fiber strands are laid down and bonded into a sheet, the sheets have a significantly higher air permeability than has heretofore been possible to attain in polyethylene plexifilamentary sheets without an accompanying significant reduction in barrier properties. The polyethylene plexifilamentary fiber strands that are flash-spun and bonded to produce the sheet material of the invention can be spun from a spin solution that is from 12% to 24% polyethylene polymer in a hydrocarbon spin agent at spinning temperatures in the range of 205° C. to 220° C.

Where a sheet must exhibit a combination of good air permeability, good liquid barrier properties, and excellent strength, as is desirable for fabrics used in apparel, the plexifilamentary fibers are preferably flash-spun at spinning temperatures of from 205° C. to 214° C. from a spin fluid comprising from 12 to 17 weight percent polyethylene in a pentane spin agent. More preferably, plexifilamentary fiber strands for use in apparel fabrics are spun at a spin temperature in the range of 208° to 212° C. from a spin fluid comprised of 14 to 16 weight percent polyethylene in a pentane spin agent. Where a sheet must exhibit a combination of high air permeability, good particulate barrier properties, and moderate strength, as is desirable for sheets used in air filters and vacuum bags, the plexifilamentary fibers are preferably flash-spun at spinning temperatures of from 205° C. to 220° C. from a spin fluid comprising from 15 to 24 weight percent polyethylene in a pentane spin agent. More preferably, plexifilamentary fiber strands for use in air filtration sheet products are spun at a spin temperature in the range of 208° to 218° C. from a spin fluid comprised of 16 to 20 weight percent polyethylene in a pentane spin agent.

Sheets of the current invention have air permeabilities in the Frazier range which is sufficiently high for air-filtration end uses, for example in vacuum cleaner bags, cabin air filtration, pleated dust cartridges, and face mask respirators. In addition, the air permeability of the unbonded sheets of the invention is sufficiently high to permit bonding using through-air bonding processes. Through-air bonding has been used to bond nonwovens such as bicomponent fiber webs, but has not been used previously to bond flash-spun plexifilamentary sheets. Conventional flash-spun sheets have had air permeabilities which are too low for through-air bonding methods. In order to use through-air bonding methods, the sheets preferably have a Frazier permeability of at least 2 $ft^3/min/ft^2$, and more preferably greater than 5 $ft^3/min/ft^2$, and most preferably 8 $ft^3/min/ft^2$. Through-air bonding involves bonding a nonwoven fiber web by drawing hot air through the web so as to cause the individual fibers within the web to be heated and exposed to the same temperature, which ensures uniformity of bonding of the fabric. Bonding occurs at the crossover points of the fibers.

One type of Tyvek® sheet material that has been historically used in apparel is whole surface bonded on one side with a linen pattern and point bonded on the opposite side with a ribbed pattern. In this type of sheet, the weight percent of the sheet that is whole surface bonded with the linen pattern has historically been approximately 60% and the weight percent of the sheet that is point bonded has historically been about 40%. It has now been found that by varying the bonding temperatures and the bonding times, that plexifilamentary sheet can be made in which a greater percent of the sheet is comprised of the point bonded portion of the sheet. It has been found that when the percent of the sheet that is point bonded with the ribbed pattern is greater than 50%, the sheet becomes significantly softer, as measured by the Handle-o-Stiffness test. Plexifilamentary sheets have now been made that are comprised of less than 40% of the whole surface bonded sheet portion and more than 60% of the point bonded sheet portion. Even softer sheets have been made wherein approximately 30% of the sheet is whole surface bonded with a linen pattern and approximately 70% of the sheet is point bonded with a ribbed pattern.

When the high permeability flash spun sheets are subject to through-air bonding, bonded sheets having properties significantly different from surface bonded or point bonded flash-spun sheets are obtained. The through-air bonded sheets have significantly higher loft than surface bonded or point bonded sheets. For example, a through-air bonded sheet having the same basis weight as a typical hard-bonded Tyvek® sheet has more than twice the thickness. Because of the more uniform heating through the thickness of the sheet, compared to conventional bonded sheets, the through-air bonded sheets are more uniformly bonded through the sheet thickness and the through-air bonded sheets do not delaminate in a planar fashion as is the case with surface bonded or point bonded plexifilamentary sheet material.

Figure 5:
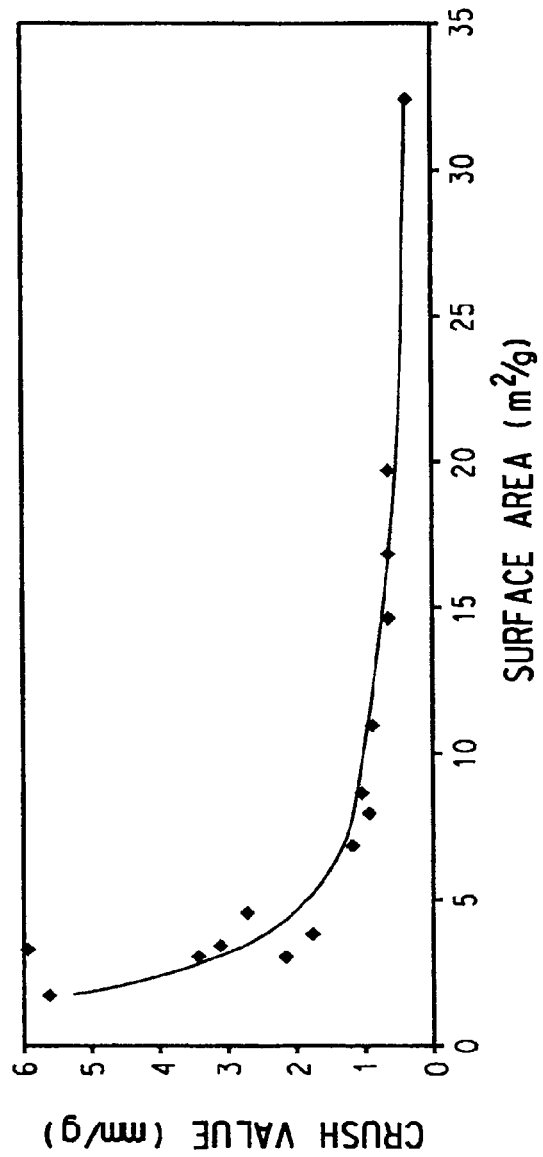
FIG. 5 is a graph of fiber crush vs. fiber surface area of plexifilamentary fiber strands spun at a variety of spinning conditions.
Figure 6:
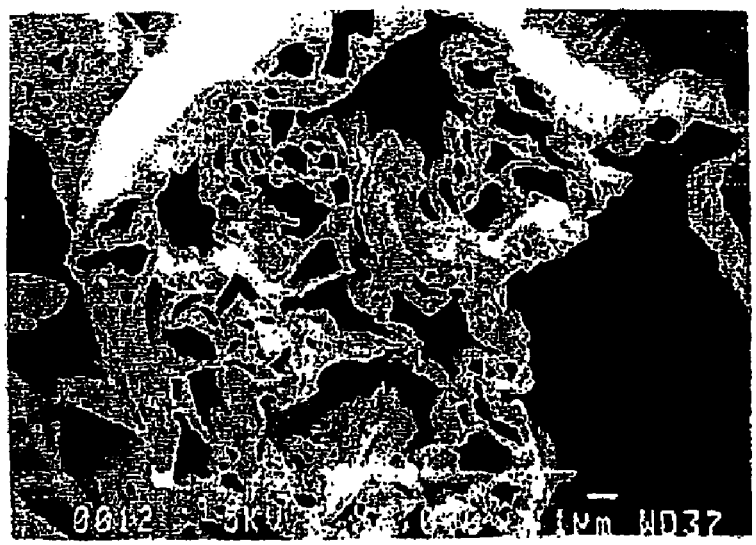
FIG. 6 is a photomicrograph taken at 4000× of a portion of a plexifilamentary fiber strand from a conventional flash-spun plexifilamentary sheet material.
Figure 7:
FIG. 7 is a photomicrograph taken at 5000× of a portion of a plexifilamentary fiber strand from the plexifilamentary sheet material of the invention.

Without wishing to be bound by theory, it is presently believed that as the spinning temperature is increased, the surface areas of the flash-spun plexifilamentary fibers produced are reduced and the fibers become less cohesive. FIG. 5 is a graph of crush value vs. surface area for polyethylene plexifilamentary fiber strands flash-spun under a variety of spinning conditions. The crush values graphed on the y-axis are calculated according to the crush test method described above and represent the degree of sample size recovery after being crushed. A higher crush value means that a fiber strand recovers its original shape more readily. Less cohesive plexifilamentary fiber strands recover more of their original size and shape after being crushed. FIG. 5 shows that as the surface area of the polyethylene plexifilamentary fibers is reduced, the fibers become less cohesive. The fibers of the flash-spun sheets of the invention generally have surface areas of less than about 10 $m^2/g$, and more preferably have surface areas of less than 8 $m^2/g$, and most preferably have surface areas of less than 5 $m^2/g$. FIG. 7 is a photomicrograph of a cross section of a plexifilamentary strand of the sheet material of the invention while FIG. 6 is a photomicrograph of a cross section of a plexifilamentary strand from a conventional plexifilamentary sheet. It can be visually seen that the plexifilamentary strand of the invention has significantly less surface area than the plexifilamentary strand of conventional plexifilamentary sheet material. It is interesting to note that many of the plexifilamentary fibers of the invention appear to be finer than conventional flash-spun plexifilamentary fibers. Normally, one would expect that as fibers become finer, their surface area would increase. With the plexifilamentary fibers of the invention, the fine fibers surprisingly have lower surface areas. It is believed that this is due to a reduction in the size and number of internal voids in the fibers.

These lower surface area, less cohesive fibers, when laid down and bonded as a sheet structure, are believed to result in sheet layers with fewer thicker portions therein and with a larger mean pore size such that a greater percentage of the sheet is made up of void space. The sheet appears to have an overall structure that is less cohesive with larger void spaces between the layers in the plane of the sheet. The end result seems to be a sheet that allows more gas and vapor to pass making the material much more permeable without a comparable reduction in barrier properties. Significantly, applicants have found that the bonded plexifilamentary sheets of the invention have a higher mean flow pore size than is found in conventional plexifilamentary sheet structures. At the same time, the largest pores in sheet of the invention are proportionally smaller (as compared to the mean flow pore size) than is the case with conventional flash-spun plexifilamentary sheets. This increase in mean flow pore size, without a proportional increase in the size of the larger pores, is believed to result in a plexifilamentary sheet structure that exhibits much greater air permeability with little loss in barrier properties.

The following table summarizes pore measurements and the ratio of the Maximum Pore Diameter to the Minimum Pore Diameter for the sheet material of the invention, bonded several different ways, and for several prior art sheet materials. Pore size measurements are provided for a conventional point-bonded sheet of flash-spun plexifilamentary fibers (Tyvek® Type 1424A) with a basis weight of 1.2 oz/yd²; a sheet of D207 meltblown polyolefin polymer with a basis weight of 1.1 oz/yd² sold by PGI of Charleston, S.C.; and a sheet of Hysurf™ polyethylene pulp having a basis weight of 2.0 oz/yd².

| Sheet Type | Max. Pore Diameter (Bubble Point) (μm) | Mean Pore Diameter (μm) | Diameter Ratio Max/Mean |
|---|---|---|---|
| Point-Bonded Sheet of Invention (Ex. 7) | 46.9 | 16.7 | 2.8 |
| Through-Air Bonded Sheet of Invention (Ex. 20) | 19.5 | 13.3 | 1.5 |
| Through-Air Bonded Sheet of Invention (Ex. 24) | 11.8 | 9.4 | 1.3 |
| Conventional Point-Bonded Plexifilamentary Sheet | 11.6 | 2.8 | 4.2 |
| PGI's D207 Meltblown | 19 | 12 | 1.6 |
| Hysurf™ | 23.9 | 8.4 | 2.8 |

The ratio of the maximum pore diameter to the mean pore diameter in conventional plexifilamentary sheets is generally greater than 4. As can be seen in the table above, when the plexifilamentary sheet of the invention is point bonded, a max/mean pore size ratio of 2.8 was achieved. This is comparable to what was obtained with the Hysurf™ pulp-based filtration sheet product. With the through-air bonded plexifilamentary sheet of the invention, a max/mean pore size ratio of 1.3 to 1.5 was achieved. This is comparable to what is to be expected of much weaker meltblown materials.

The plexifilamentary fiber strands of the invention have a surface area of less than 10 $m^2/g$ and a crush value of at least 1 mm/g Preferably, the plexifilamentary fiber strand has a surface area of less than 8 $m^2/g$, and more preferably less than less than 5 $m^2/g$. It is further preferred that the fiber strand of the invention have a crush value of at least 1.5 mm/g The nonwoven sheet of the invention is comprised of substantially continuous polyethylene plexifilamentary fiber strands and it has a Frazier Permeability, normalized to 1.0 oz/yd$^2$ basis weight, of at least 2 cfm/ft$^2$. Preferably, the nonwoven sheet has a hydrostatic head of at least 30 cm, and more preferably of at least 45 cm, and more preferably of at least 75 cm, and more preferably of at least 85 cm, and even more preferably of at least 100 cm, and most preferably of at least 130 cm. It is further preferred that the sheet of the invention, with a hydrostatic head of at least 30 cm, also have a Frazier Permeability, normalized to 1.0 oz/yd$^2$ basis weight, of at least 4 cfm/ft$^2$, and more preferably of at least 8 cfm/ft$^2$, and more preferably of at least 10 cfm/ft$^2$, and more preferably of at least 15 cfm/ft$^2$, and even more preferably of at least 20 cfm/ft$^2$, and most preferably of at least 25 cfm/ft$^2$. According to another preferred embodiment of the invention, the sheet material of the invention has a hydrostatic head of at least 45 inches (114 cm) and a Gurley Hill Porosity of less than 6 seconds. According to an even more preferred embodiment of the invention, the sheet material of the invention has a hydrostatic head of at least 50 inches (127 cm) while maintaining a Gurley Hill Porosity of less than 6 seconds. The nonwoven sheet of the invention is preferably a unitary fibrous sheet. The flash-spun polyethylene plexifilamentary nonwoven sheet of the invention may be whole surface bonded, point bonded or through-air bonded.

Figure 2:
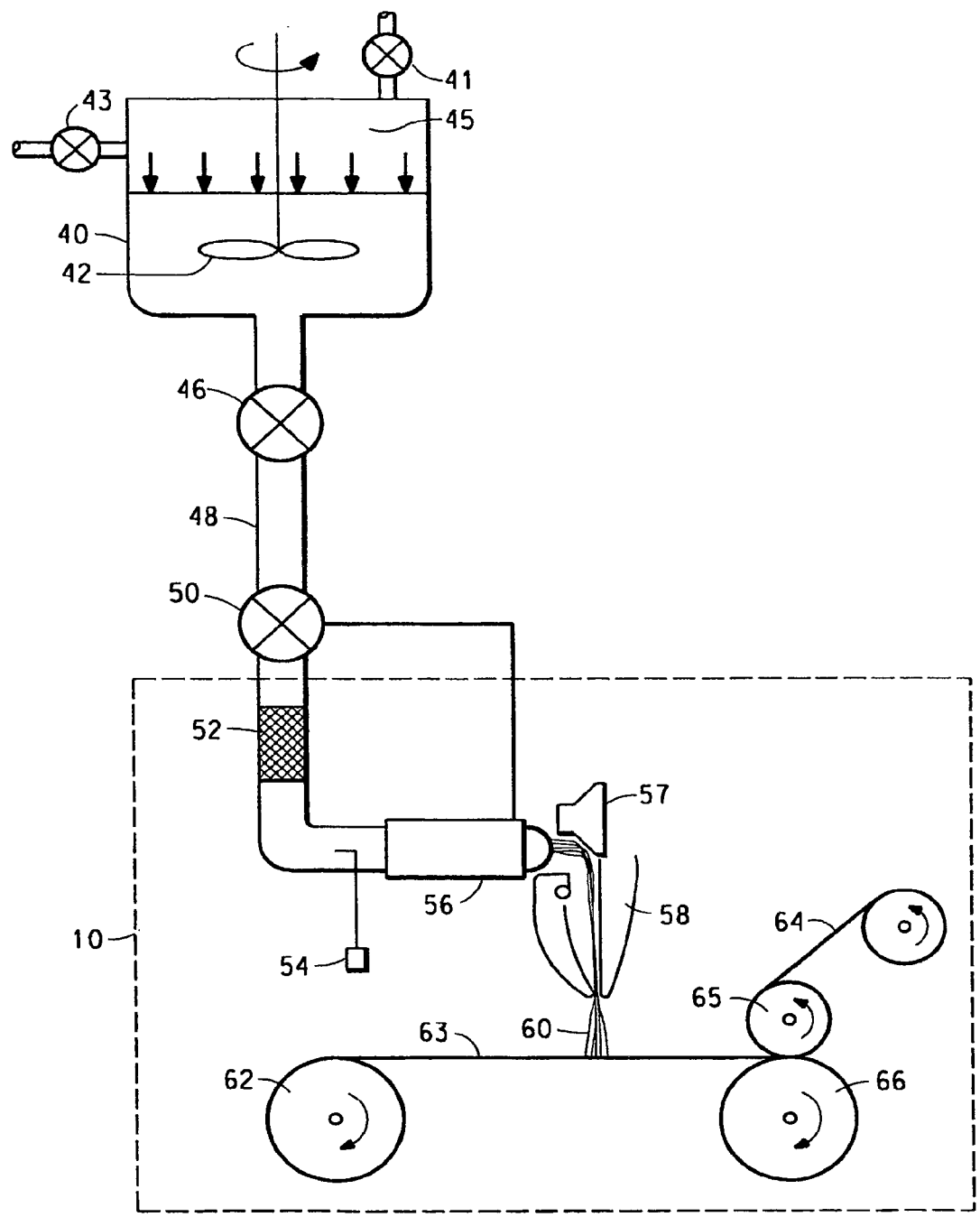
FIG. 2 is a schematic cross sectional illustration of a system used for making flash-spun plexifilamentary sheets.

An apparatus that has been used for producing the plexifilamentary fiber strands of the invention is shown in FIG. 2. According to a process for making the plexifilamentary fiber strands and sheets of the invention, polyethylene polymer is charged to an autoclave 40 through a port 41. After charging, air is removed from the autoclave by pulling a vacuum through the valve 43. In order to evacuate all oxygen from the autoclave, nitrogen is added to the autoclave and then removed by vacuum two or three times in a row. Next, the spin agent is charged to the autoclave 40 through the valve 43 while the clave is maintained at approximately 52° C. The autoclave is sealed and gradually heated over a period of about 4 hours to a temperature of about 210° to 220° C. while the polymer and spin agent are mixed with a double helical agitator 42 rotating at about 100 rpm. After the 4 hours of heating and mixing, the pressure of the spin fluid reaches about 13,790 kPa (2000 psi).

Just prior to spinning, a blanket of nitrogen gas 45 is introduced into the autoclave through the valve 43. Spinning of the spin fluid is commenced by opening a ram valve 46 whereupon the spin fluid is forced out of the autoclave by the blanket of pressurized nitrogen 45. The spin fluid flows through a heated 0.75 inch (1.9 cm) diameter line 48 to a pressure control valve 50, which regulates the pressure of the spin fluid in the spin pack 56. The spin fluid passes through a 10 inch (25.4 cm) sintered metal filter 52 before entering the spin pack 56. The actual spin temperature of the spin fluid is monitored by a temperature probe 54 immediately upstream of the spin pack.

Figure 3:
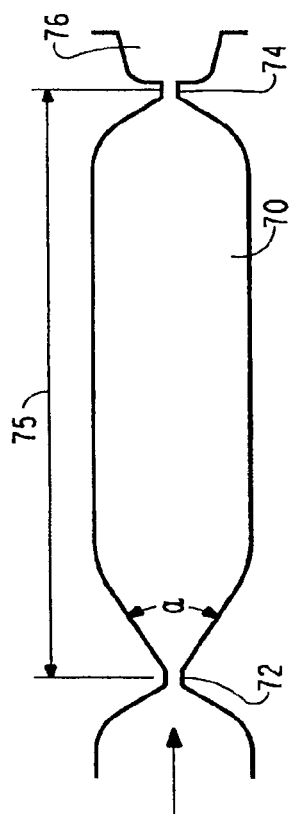
FIG. 3 is a cross sectional view of a letdown chamber in the system shown in FIG. 2.

The spin pack 56 includes a letdown chamber and spin orifice similar to the letdown chamber 16 and spin orifice 14 shown in FIG. 1. A letdown chamber that has been used to obtain the plexifilamentary fiber strands and sheets of the invention is shown in FIG. 3. Spin fluid enters the letdown chamber 70 through an opening 72 having a length of 0.064 cm and a diameter of 0.095 cm. The entrance angle a of the letdown chamber is between 10° and 70°. The letdown chamber has a diameter of 1.56 cm and a length 75 of about 11.6 cm. In the examples described below, the entrance angle of the letdown chamber was set at 15°, 23.6° or 60°. The letdown chamber tapers toward a spin orifice 74 at an angle of about 80°. According to one method for making the plexifilamentary strand and sheet of the invention, fine mesh screens can be inserted in the letdown chamber 70. For example, seven 50 mesh screens, each spaced a distance of about 0.32 cm relative to one another, have been successfully used in the letdown chamber with an entrance angle of 23.6° when spinning the plexifilamentary strand of the invention.

The spin orifice at the exit end of the letdown chamber preferably has a length of 0.064 cm and a diameter of 0.087 cm (L/D=0.74). A spin tunnel is preferably located immediately downstream of the spin orifice. One preferred spin tunnel has a length of 0.84 cm, an entrance diameter of 0.46 cm, and an exit diameter of 0.61 cm. The sides of the spin tunnel may meet the back of the spin tunnel at a hard edge or a rounded edge like that shown in FIG. 3. In the examples below, a spin tunnel with the hard edge is designated as "no-rad" and a spin tunnel with a rounded edge having a radius of curvature of about 1.3 mm is designated as "rad".

As can be seen in FIG. 2, the spin pack included a rotating baffle 57 similar to the baffle 26 shown in FIG. 1. The baffle 57 serves to spread the plexifilamentary strand being discharged from the spin orifice 74 and to oscillate the strand back and forth for deposit on the moving scrim 63. Preferably, the baffle oscillates the plexifilamentary strand at about 90 Hz to form a sheet with a width of about 50 cm on the moving scrim 63. The strand is electrostatically charged by passing the strand between an electric charging ion gun and metal target plate incorporated into a gas flow diffuser 58. The ion gun may consist of 21 charging needles located in two rows concentric with one another (with 11 needles in the first row spaced 10° on a 7.6 cm radius, and 10 needles in the second row spaced 10° on an 8.9 cm radius). The charging polarity is negative. Preferably, the charging needle points are located about 1.9 cm from the target plate surface. The target plate is connected to earth ground and has a diameter of about 23 cm. After the strand is charged by passing it between the ion gun and target plate, the strand and gaseous spin agent pass through a diffuser which has an exit gap of about 6 cm and a radius of about 20 cm. The diffuser serves to reduce turbulence and further spread the descending plexifilamentary strand.

The distance from the center, bottom of the diffuser 58 to the moving belt collection scrim is preferably about 25 cm. The moving collection scrim 63 is preferably an open scrim material such as Reemay® Style No. 2250 spunbonded polyester fabric with a basis weight of 17 g/m$^2$ (0.5 oz/yd$^2$) and a Frazier porosity of 329 m$^3$ /min/m$^2$ (1080 ft$^3$/min/ft$^2$). The collection scrim 63 is provided from a supply roll 62 and then pulled over an electrically grounded supporting metal plate. The speed of the moving collection scrim 63 is varied so as to collect oscillating plexifilamentary strand and form a plexifilamentary batt of a desired basis weight. A second sheet 64 of the open scrim material, such as the Reemay® Style No. 2250 spunbonded polyester fabric, is rolled onto the top of the batt of flash-spun plexifilamentary material and under a metal consolidation roll 65 as the batt is wound onto the collection roll 66. The lightly consolidated batt of plexifilamentary material sandwiched between two sheets of the open scrim material is referred to in the following examples as the unbonded sheet. The properties of the unbonded sheets were measured with the open scrim sheet in place on both sides of the lightly consolidated plexifilamentary material. The scrim material is so open that it has been found to have no effect on the air and moisture permeabilities or the hydrostatic head properties measured for the unbonded sheets.

The unbonded plexifilamentary sheets of the invention can be bonded according to bonding methods that have traditionally been used to thermally bond polyethylene plexifilamentary sheets. For example, the plexifilamentary sheets of the invention can be whole surface bonded on a large, smooth, heated roll bonder according to a bonding process very similar to the process disclosed in U.S. Pat. No. 3,532,589 issued to David in order to produce a "hard structure" sheet product. According to this bonding process of the David patent, both sides of the sheet are subjected to generally uniform, full surface contact thermal bonding. The "hard structure" product has the feel of slick paper.

For apparel applications, the sheet 35 is typically point bonded and optionally softened as disclosed in U.S. Pat. Nos. 3,427,376 and 3,478,141 to produce a "soft structure" product with a more fabric like feel. The intent with point bonding is to provide closely spaced bonding points with unbonded fiber therebetween in an aesthetically pleasing pattern. A preferred point bonding pattern is produced when the sheet is contacted by thermal bonding rolls with undulated surfaces that give rise to portions of the fabric having very slight thermal bonding while other portions are more clearly subjected to bonding. After the fabric sheet is bonded, it is optionally subjected to mechanical softening to remove hardness that may have been introduced during bonding. This improves the feel and tactile qualities of the fabric. Importantly, when the sheet of the invention is point-bonded but not subjected to softening treatment, it has been found to exhibit a degree of softness and drape that could be obtained with conventional plexifilamentary sheet material only by both point bonding and softening the sheet.

Figure 4:
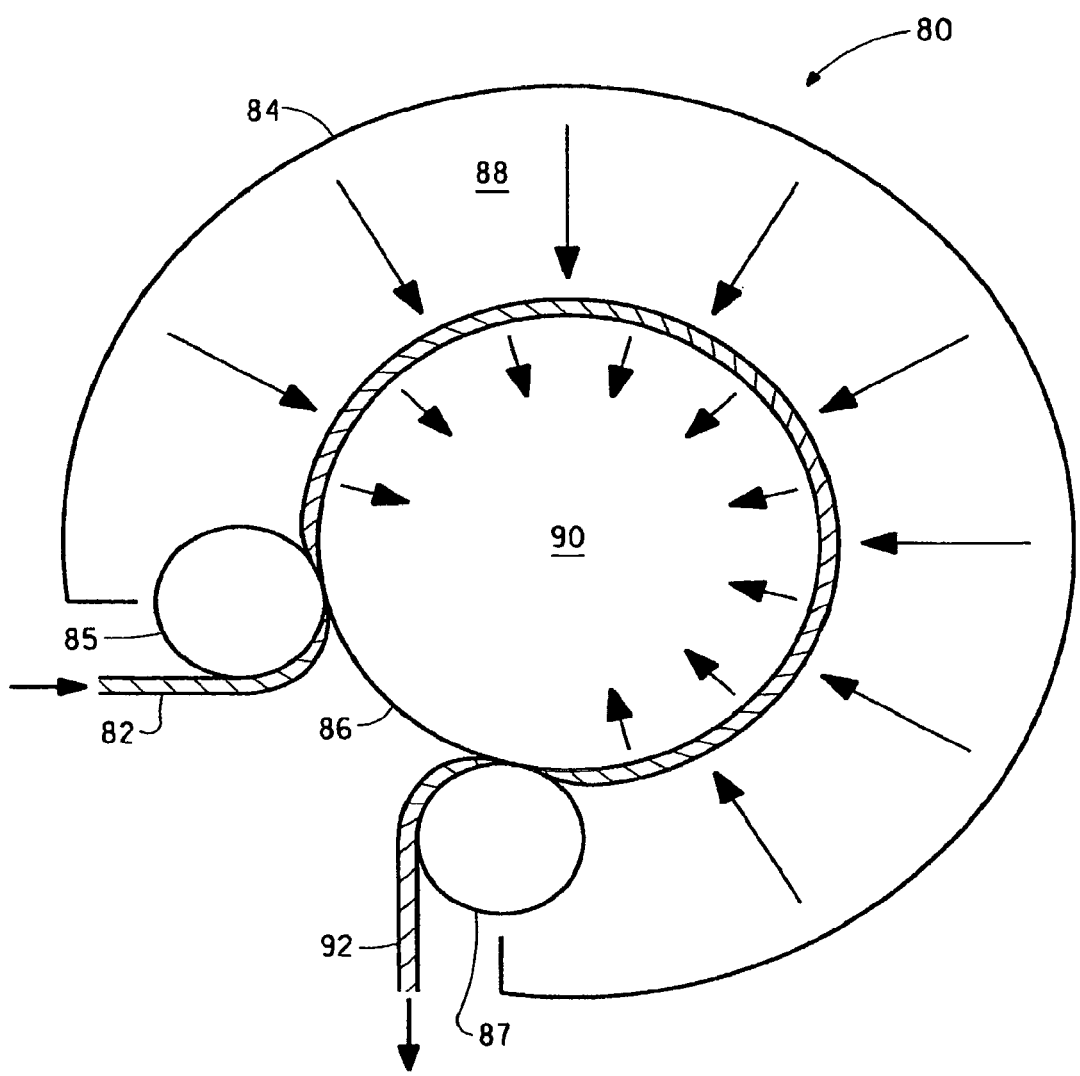
FIG. 4 is a schematic cross sectional view of an apparatus for through-air bonding a plexifilamentary sheet material.

In addition the unbonded plexifilamentary sheet material of the invention can also be bonded by a through-air bonding process that was not possible with conventional plexifilamentary sheets of low air porosity. Through-air bonding methods are known in the art and can be performed using a perforated drum unit or a horizontal conveyer type unit. For example, through air bonding can be conducted using an apparatus 80 that is schematically illustrated in FIG. 4. An unbonded plexifilamentary sheet 82, sandwiched between layers of open scrim material, is fed between a vacuum roll 86 and roll 85. The vacuum roll 86 is about 1.4 meters in diameter and is made of an open mesh metal screen material. As the plexifilamentary sheet rotates with the vacuum roll 86, heated air 88 is supplied through a plenum 84 at a temperature of about 130° to 140° C. and a pressure drop across the sheet of about 200 to 350 mm of water. The air velocity across the sheet is between 0.5 and 2.0 m/sec and the dwell time may be as long as 6 seconds. The air is heated to a temperature that is sufficiently high to cause bonding of the fibers throughout the sheet thickness. Once the heated air passes through the sheet, it passes through the open mesh vacuum roll 86 and into a vacuum drum 90. After the sheet travels most of the way around the vacuum roll 86, an exit roll 87 removes the plexifilamentary sheet from the vacuum roll 86.

Importantly, it has been found possible to produce the more permeable fabric or sheet material of the present invention while maintaining the strength and durability of conventional flash-spun polyethylene sheets. In addition, recyclability and lower cost are built into the unitary flash-spun fabrics or sheet materials of the present invention as compared to the laminated products with which the material of the invention must often compete in the marketplace. This invention will now be illustrated by the following non-limiting examples which are intended to illustrate the invention and not to limit the invention in any manner.

EXAMPLES

The spin fluids used in Examples 1-27 were prepared batch-wise in the 12 gallon autoclave described above with regard to FIG. 2. The spin fluids were prepared and flash-spun according to the process described above with regard to FIG. 2. The polymer concentrations reported in the examples were calculated as the weight percent of polymer based on the total spin fluid weight, where the total spin fluid weight includes the weight of polymer and spin agent.

Spin pack dimensions were as follows unless indicated otherwise: The orifice at the entrance end of the letdown chamber had a length of 0.064 cm and a diameter of 0.095 cm; the spin orifice at the exit end of the letdown chamber had a length of 0.064 cm and a diameter of 0.087 cm (L/D=0.74); the spin tunnel located immediately downstream of the spin orifice had a length of 0.84 cm, an entrance diameter of 0.46 cm, and an exit diameter of 0.61 cm. In the tables in the examples below, a spin orifice indicated as "std" is the spin orifice described above having a L/D of 0.74. In some examples, an array of screens was placed near the entrance of the solution flow into the letdown chamber. In these examples, seven 50 mesh screens were used and were spaced a distance of about 0.32 cm relative to one another in an 11.6 cm long letdown chamber with a 1.56 cm diameter and an entrance angle of 23.6°. In examples where there were no screens in the letdown chamber, the letdown chamber had a diameter of 1.56 cm, a length of 11.6 cm, and an entrance angle of 60°, unless indicated otherwise. The spin pack used in all of the examples included the specific oscillating baffle, electric charging ion gun, metal target plate, and gas flow diffuser described above with regard to FIG. 2. The open scrim material used in each of the examples was the Reemay® Style No. 2250 spunbonded polyester fabric described above, which has a basis weight of 17 g/m$^2$ (0.5 oz/yd$^2$) and a Frazier porosity of 329 m$^3$/min/m$^2$ (1080 ft$^3$/min/ft$^2$)

Unless otherwise indicated, the plexifilamentary webs and sheets prepared in Examples 1-28 were flash-spun using a spin agent of 60 weight percent normal pentane and 40 weight percent cyclopentane, the latter having a purity of 81 weight percent, the primary impurity being 15% 2-2 dimethyl butane. The polymer used in all of the examples was high density polyethylene having a melt index of 0.7 g/10 min (measured according to ASTM D1238 at 190° C. and 2.16 kg load), a melting point of about 133° C. and a density of 0.96 g/cm$^3$ (Alathon®, obtained from Equistar Chemicals LP of Houston, Tex.). The polyethylene included 1200 ppm of a thermal stabilizer.

Examples 1-5 and Comparative Example A (Whole Surface Bonded Sheets)

In Examples 1-5 and Comparative Example A, sheets of high density polyethylene were flash-spun over the range of spinning conditions and polymer concentrations listed in Table 1. In each example, the unbonded sheet was whole surface bonded on a steam heated bonding roll with a diameter of about 4 ft according to a bonding process very similar to the process disclosed in U.S. Pat. No. 3,532,589 issued to David. During the whole surface bonding, the open scrim material was left on opposite sides of the plexifilamentary material such that a layer of the scrim material was always between the plexifilamentary sheet sample and the heated bonding surface. During bonding, a constraining blanket was pressed against the sheet of scrim material facing away from the bonding roll so as to provide sufficient normal force on the sample during bonding to prevent shrinkage. Each side of the sheet was run over the bonding roll one time at a speed of 300 ft/min. The scrim material was then removed from the bonded sheet. Bonding on a rough scrim surface helps to improve the permeability of the sheet material.

The spinning conditions, and web and sheet properties are given in Table 1. In each of the examples reported in Table 1, the letdown chamber entrance angle was 23.6°. The results demonstrate that the normalized Frazier permeabilities for the unbonded sheets of the current invention are about four to nine times higher than that of the comparative Example which was spun at a lower temperature. The area-bonded sheets of the current invention also had higher air permeabilities than the comparative Example, with air flows in the bonded sheets of the invention remaining in the Frazier range.

TABLE 1

| Whole Surface Bonded Sheets | | | | | | |
|---|---|---|---|---|---|---|
| EXAMPLE | A | 1 | 2 | 3 | 4 | 5 |
| Spinning Conditions: | | | | | | |
| Spinning Temperature (° C.) | 180 | 209 | 209 | 211 | 214 | 216 |
| Polymer Concentration (wt %) | 19.4 | 18 | 22 | 22 | 16 | 16.1 |
| Letdown Pressure (psi) | — | 1390 | 1270 | 1280 | 1575 | 1510 |
| Screens | 7 × 50 | 7 × 50 | 7 × 50 | 7 × 50 | 7 × 50 | 7 × 50 |
| Spin Orifice L/D | Std | 4/1 | 4/1 | 4/1 | 4/1 | Std |
| Tunnel | no rad | rad | rad | rad | no rad | no rad |
| Polymer Flow Rate (lb/hr) | 50.2 | 56.8 | 61.6 | 61.8 | 55.9 | 54.7 |
| Web Properties: | | | | | | |
| Denier | 327 | 316 | 402 | 394 | 333 | 269 |
| Surface Area (m$^2$/g) | — | 3.3 | 2.81 | 2.09 | 1.0 | 4.65 |
| Modulus (g/denier) | 22 | 12.1 | 8.1 | 7.1 | 5.5 | 23.4 |
| Tenacity (g/denier) | 5.4 | 3.68 | 2.68 | 2.86 | 2.05 | 5.37 |
| Elongation (%) | 46 | 60 | 56 | 57 | 60 | 60 |
| Sheet Properties (Unbonded): | | | | | | |
| Basis Weight (oz/yd$^2$) | 1.96 | 2.53 | 1.55 | 1.86 | 1.97 | 1.75 |
| Gurley Hill (sec) | 131 | 0.0 | 0.0 | 0.0 | 0.0 | 0.4 |
| Actual Frazier (cfm/ft$^2$) | — | 16.9 | 43.5 | 32.7 | 13.2 | 17.3 |
| Frazier (normalized to 1.0 oz/yd$^2$ BW) (cfm/ft$^2$) | — | 42.8 | 67.4 | 60.8 | 26.0 | 30.3 |
| Hydrostatic Head (cm) | 40 | 62.8 | 48.3 | 46.7 | 45.9 | 72.0 |
| MVTR-LYSSY (g/m$^2$/day) | 1105 | 2196 | 2237 | 2201 | 2260 | 2696 |
| Sheet Properties (Area Bonded): | | | | | | |
| Steam Pressure (psi) | 50 | 56 | 56 | 60 | 60 | 56 |
| Basis Weight (oz/yd$^2$) | 2.14 | 2.81 | 1.76 | 2.6 | 2.10 | 1.78 |
| Gurley Hill (sec) | 90 | 0.9 | 0.5 | — | — | 0.9 |
| Actual Frazier (cfm/ft$^2$) | — | 4.3 | 8.5 | 10.8 | 13.2 | 5.0 |
| Frazier (normalized to 1.0 oz/yd$^2$ BW) (cfm/ft$^2$) | — | 12.1 | 15.0 | 28.1 | 27.7 | 8.9 |
| Hydrostatic Head (cm) | 55 | 77.8 | 60.8 | 58.4 | 58.4 | 94.0 |
| MVTR-LYSSY (g/m$^2$/day) | 875 | 2072 | 2061 | 2005 | — | — |
| Mullenburst (psi) | — | 105 | 41 | — | — | — |
| Mean pore size (μm) | — | — | — | — | 15.8 | — |
| Maximum pore size (μm) | — | — | — | — | 32.2 | — |
| Ratio Max/Mean Pore Size | — | — | — | — | 2.0 | — |

Examples 6-8 and Comparative Example B (Point-Bonded Sheets)

In Examples 6-8 and Comparative Example B, sheets of high density polyethylene were flash-spun over the range of spinning conditions and polymer concentrations listed in Table 2. The unbonded sheets were produced by the method described above with the exception of Comparative Example B which was spun on a commercial flash spinning line like that shown in FIG. 1.

Figure 9:
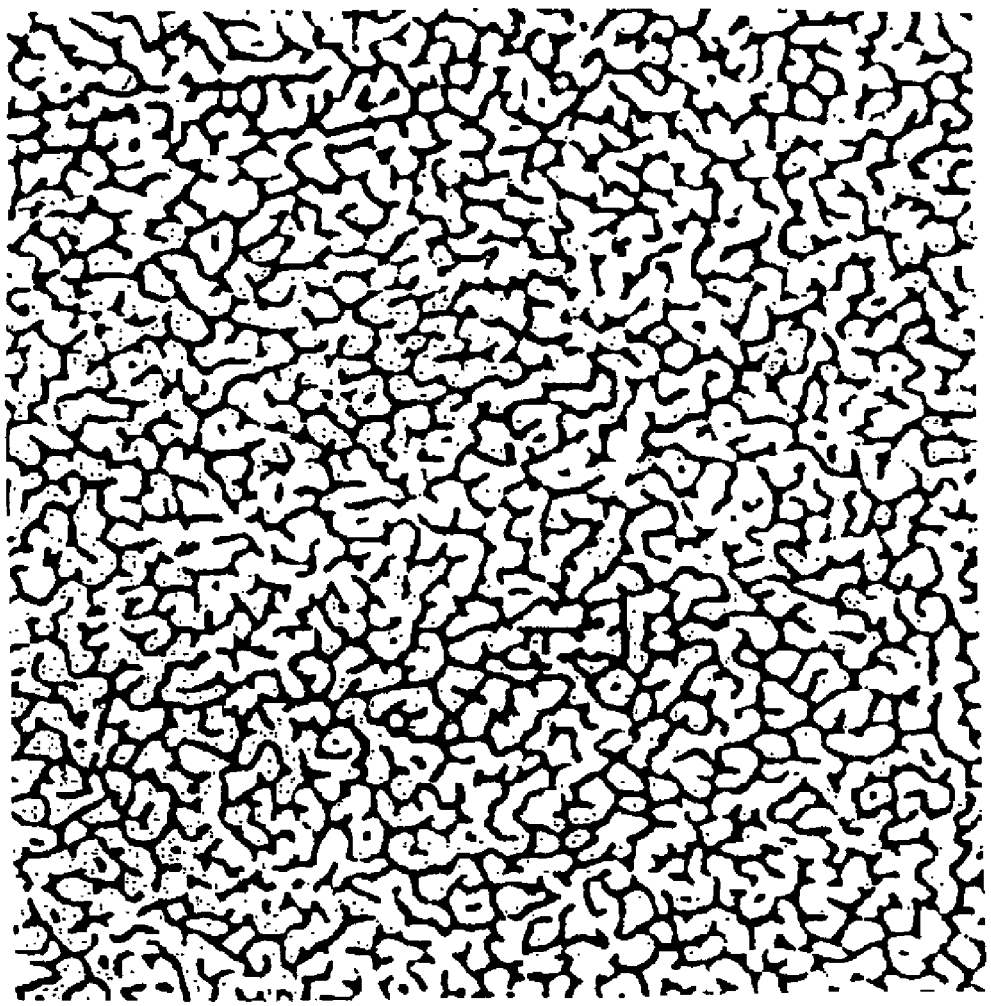
FIG. 9 is a plan view of a portion of the surface of one embossing roll that can be used for bonding the sheet material of the invention.

In each of Example 6-8, the open scrim material was first removed from one side of the sample without substantially altering the flash-spun sheet structure. The side of the sheet from which the scrim material had been removed was brought into contact with a random patterned, 34 inch diameter, steam-heated embossing roll, and bonded in a nip formed between the random pattern embossing roll and a 30 inch diameter soft rubber backup roll having durometer of 70. This embossing roll was a stainless steel—surfaced roll with a random pattern of raised areas extending approximately 0.008 to 0.020 inches (0.203 to 0.508 mm) out from the surface of the remainder of the roll. The random pattern on the surface of the embossing roll was like that shown in FIG. 9. The sheet was passed over the random pattern embossing roll at a speed of 150 ft/min while the roll was heated to between 140° and 144° C. The nip pressure was sufficient for the embossing roll to make a 20 mm long nip footprint in the soft rubber roll. Due to the random pattern on the embossing roll, the embossing roll contacted only 25% to 30% of the sheet being bonded.

After one side of the plexifilamentary sheet was bonded with the smooth random pattern, the scrim was removed from the other side of the sheet which was then point bonded against an embossing roll with a ribbed patterned. The second side of the sheet from which the scrim material was removed was brought into contact with a "ribbed" pattern, 34 inch diameter, steam-heated embossing roll, and bonded in a nip formed between the ribbed pattern embossing roll and a 30 inch diameter soft rubber backup roll having durometer of 70. This embossing roll was a stainless steel—surfaced roll covered with a series of elongated parallel ribs that were each roughly 0.025 inches (0.635 mm) wide, were raised approximately 0.015 inches (0.381 mm) from the surface of the remainder of the roll, and were spaced every 0.063 inches (1.6 mm) The sheet was passed over the ribbed embossing roll at a speed of 150 ft/min while the roll was heated to between 140° and 144° C. The nip pressure was sufficient for the ribbed embossing roll to make a 20 mm long nip footprint in the soft rubber roll.

The sheet of Comparative Example B was bonded as described above with regard to Examples 6-8, except that the whole surface bonding roll had a linen-like surface. In Comparative Example B, the open scrim material was first removed from one side of the sample without substantially altering the flash-spun sheet structure. The side of the sheet from which the scrim material had been removed was brought into contact with a linen-like patterned, 34 inch diameter, steam-heated embossing roll, and bonded in a nip formed between the linen-like patterned embossing roll and a 30 inch diameter soft rubber backup roll having durometer of 70. This embossing roll was a stainless steel—surfaced roll with a linen-like pattern formed from two sets of closely spaced, thin, discontinuous, and generally parallel raised lines extending perpendicular to each other. The thin lines are approximately 0.005 to 0.015 inches (0.127 to 0.381 mm) thick and are raised approximately 0.008 inches (0.203 mm) out from the surface of the remainder of the roll. The smooth linen pattern on the surface of the embossing roll imparts a very slight texture on a sheet material being bonded which texture has the look of a woven linen material. The sheet was passed over the linen pattern embossing roll at a speed of 150 ft/min while the roll was heated to between 144° and 158° C. The nip pressure was sufficient for the embossing roll to make a 19 mm long nip footprint in the soft rubber roll.

The point bonded sheet was pin softened according to the process disclosed in Dempsey et al., U.S. Pat. No. 3,478,141 and was subsequently treated with a fluorochemical finish consisting of 5% FC 808 fluorochemical repellant (made by 3M Corporation of St. Paul, Minn.), 1% Zonyl Activator 100 (made by E. I. du Pont de Nemours and Company of Wilmington, Del.), 0.75% Zelac 9012 antistatic finish (made by Stepan of Northfield, Ill.), and 0.55% hexanol.

The spinning conditions, web properties, and the point-bonded and unbonded sheet properties are given in Table 2. Pore measurements for the bonded sheets were made with the random-embossed side up.

TABLE 2

| Point Bonded Sheets | | | | |
|---|---|---|---|---|
| EXAMPLE | 6 | 7 | 8 | B |
| Spinning Conditions: | | | | |
| Spinning Temperature (° C.) | 209 | 220 | 208 | 190 |
| Polymer Concentration (wt %) | 22 | 16.3 | 12 | 17 |

TABLE 2-continued

| Point Bonded Sheets | | | | |
|---|---|---|---|---|
| EXAMPLE | 6 | 7 | 8 | B |
| Letdown Pressure (psi) | 1270 | 1480 | 1670 | 960 |
| Screens | 7 × 50 | 7 × 50 | 7 × 50 | none |
| Spin Orifice L/D | 4/1 | std | Std | std |
| Spin Tunnel | Rad | no rad | no rad | rad |
| Entrance Angle (degrees) | 23.6 | 23.6 | 23.6 | 15 |
| Polymer Flow Rate (lb/hr) | 61.1 | 47.5 | 46.9 | 47.0 |
| Web Properties: | | | | |
| Denier | 402 | 255 | 201 | 246 |
| Surface Area (m²/g) | 2.81 | 4.19 | 7.66 | 15.5 |
| Modulus (g/denier) | 8.1 | 9.7 | 17.7 | 26 |
| Tenacity (g/denier) | 2.68 | 2.76 | 4.16 | 5.9 |
| Elongation (%) | 56 | 34 | 39 | 45 |
| Sheet Properties (Unbonded): | | | | |
| Basis Weight (oz/yd²) | 1.55 | 1.3 | 1.03 | 1.2 |
| Gurley Hill (sec) | 0.0 | 0.4 | 1.7 | 15 |
| Actual Frazier (cfm/ft²) | 43.5 | 28.3 | 2.1 | — |
| Frazier (normalized to 1.0 oz/yd² BW) (cfm/ft²) | 67.4 | 36.8 | 2.2 | — |
| Hydrostatic Head (cm) | 48.3 | 58.2 | 89.7 | 76 |
| MVTR-LYSSY (g/m²/day) | 2237 | 2339 | 2183 | — |
| Sheet Properties (Point Bonded): | | | | |
| Basis Weight (oz/yd²) | 1.26 | 1.39 | 1.18 | 1.2 |
| Gurley Hill (sec) | — | — | — | 8 |
| Actual Frazier (cfm/ft²) | 23.0 | 18.3 | 2.1 | — |
| Frazier (normalized to 1.0 oz/yd² BW) (cfm/ft²) | 29.0 | 25.4 | 2.5 | — |
| Hydrostatic Head (cm) | 50.0 | 61.1 | 124.8 | 107 |
| MVTR-LYSSY (g/m²/day) | 2253 | 2206 | 2164 | 1700 |
| Mean pore size (μm) | — | 16.7 | — | 2.8 |
| Maximum pore size (μm) | — | 46.9 | — | 11.6 |
| Ratio Max/Mean Pore Size | — | 2.8 | — | 4.2 |

Examples 9-15 and Comparative Examples B-E (Fiber Properties—Crush/Cohesiveness)

In these Examples, high density polyethylene plexifilamentary webs were flash-spun using the same polymer as Example 1 and the crush values and surface areas were measured. The spinning conditions and test results are reported in Table 3. Note that Example B in Table 3 relates to the same sample as Example B in Table 2. Also note that Example 1 in Table 3 relates to the same sample as Example 1 in Table 1.

The results demonstrate that, although the flash-spun webs of the current invention are more easily crushed (lower normalized crush height) than the comparative examples, they surprisingly do not develop as much of a permanent set. This "restoring" characteristic, an indication of increased non-cohesiveness, is reflected in the higher crush values for the samples of the invention. The webs of the invention are further distinguished from the comparative examples by significantly lower web surface area.

TABLE 3

| Crush Testing | | | | | | |
|---|---|---|---|---|---|---|
| Example | C | B | D | E | 9 | 10 |
| Spinning Conditions | | | | | | |
| Polymer Concentration (wt %) | 18 | 17 | 17.5 | 15.8 | 20 | 16 |
| Spinning Temperature (° C.) | 185 | 190 | 198 | 200 | 211 | 207 |
| Letdown Pressure (psi) | 700 | 960 | 1100 | — | 1310 | — |
| Screens | 7 × 50 | none | none | none | 7 × 50 | None |
| Spin Orifice L/D | 4/1 | Std | Std | Std | 4/1 | Std |

TABLE 3-continued

| | | | Crush Testing | | | |
|---|---|---|---|---|---|---|
| Entrance Angle (degrees) | 23.6 | 60 | 60 | 60 | 23.6 | 60 |
| Tunnel | Rad | No rad | No rad | No rad | Rad | No rad |
| Crush Properties | | | | | | |
| Actual Crush Height | 13.7 | 11.3 | 20.7 | 9.0 | 15.0 | 9.3 |
| Normalized Crush Height (mm) (Normalized to 1 g) | 7.3 | 6.3 | 7.8 | 5.9 | 5.8 | 5.8 |
| Restored Height (mm) | 14.9 | 12.4 | 22.4 | 10.3 | 23.6 | 11.4 |
| Crush value (mm/g) | 0.66 | 0.61 | 0.64 | 0.86 | 3.35 | 1.32 |
| Surface Area (g/m$^2$) | 19.73 | 14.78 | 17.12 | 11.16 | 2.89 | 6.36 |

| Example | 11 | 12 | 1 | 13 | 14 | 15 |
|---|---|---|---|---|---|---|
| Spinning Conditions | | | | | | |
| Polymer Concentration (wt %) | 18 | 14 | 18 | 16 | 16 | 20 |
| Spinning Temperature (° C.) | 208 | 209 | 209 | 210 | 210 | 218 |
| Letdown Pressure | — | 1520 | 1390 | 1370 | 1350 | 1415 |
| Screens | None | 7 × 50 | 7 × 50 | None | 7 × 50 | 7 × 50 |
| Spin Orifice L/D | Std | 4/1 | 4/1 | std | Std | 4/1 |
| Entrance Angle (degrees) | 60 | 23.6 | 23.6 | 15° | 23.6 | 23.6 |
| Tunnel | No rad | No rad | Rad | No rad | Rad | Rad |
| Crush Properties | | | | | | |
| Actual Crush Height(mm) | 16.7 | 12.0 | 13.3 | 13.3 | 15.3 | 13.7 |
| Normalized Crush Height (mm) (Normalized to 1 g) | 6.9 | 5.5 | 5.8 | 6.3 | 7.1 | 5.3 |
| Restored Height (mm) | 19.4 | 15.9 | 20.5 | 19.1 | 17.5 | 28.3 |
| Crush value (mm/g) | 1.13 | 1.78 | 3.13 | 2.75 | 1.02 | 5.71 |
| Surface Area (g/m$^2$) | 8.07 | 3.57 | 3.30 | 4.6 | 7.5 | 1.7 |

Examples 16-19

(Filtration Properties—Whole Surface Bonded Sheets)

In Examples 16 through 19, filtration properties were measured on whole surface bonded sheets of the current invention. In Example 16, filtration properties were measured on the whole surface bonded sheet described in Example 3 (spinning temperature=211° C., polymer concentration=22 weight percent based on total spin fluid). In Example 17, the whole surface bonded sheet of Example 3 was electrostatically charged using the method described in Tsai et al. U.S. Pat. No. 5,401,446, which is assigned to the University of Tennessee, before filtration properties were measured. In Example 18, filtration properties were measured on the whole surface bonded sheet described in Example 4 (spinning temperature=214° C., polymer concentration=16 weight percent based on total spin fluid). In Example 19, the whole surface bonded sheet of Example 4 was charged using the method described in Tsai et al. U.S. Pat. No. 5,401,446 before filtration properties were measured. The filtration properties are set forth in Table 4 below.

TABLE 4

Air Filtration Collection Efficiencies

| Example | Velocity (cm/sec) | Pressure Drop (inches H$_2$O) | Filtration Efficiency (0.3 μm) | Filtration Efficiency (0.966 μm) |
|---|---|---|---|---|
| 16 (uncharged) | 15 | 1.95 | 95.81 | 98.04 |
| | 30 | 3.90 | 96.97 | 98.69 |
| 17 (charged) | 15 | 1.61 | 98.96 | 98.36 |
| | 30 | 3.10 | 99.00 | 98.25 |
| 18 (uncharged) | 15 | 1.20 | 94.18 | 93.95 |
| | 30 | 2.25 | 93.21 | 96.25 |
| 19 (charged) | 15 | 1.65 | 99.43 | 99.30 |
| | 30 | 3.25 | 99.71 | 99.67 |

TABLE 4-continued

Air Filtration Collection Efficiencies

| Example | Velocity (cm/sec) | Pressure Drop (inches H$_2$O) | Filtration Efficiency (0.3 μm) | Filtration Efficiency (0.966 μm) |
|---|---|---|---|---|
| HYSURF ™ | 15 | 2.09 | 81.80 | 98.00 |
| | 30 | 4.20 | 90.20 | 98.50 |
| Filtrete ™ | 15 | 0.56 | 99.28 | 99.83 |
| | 30 | 1.06 | 98.97 | 99.00 |
| Micro-Lined ® | 15 | 1.25 | 84.0 | 91.90 |
| | 30 | 2.78 | 85.3 | 92.6 |

As can be seen from the data, even in the absence of charging, the whole surface bonded sheets of the current invention have filtration efficiencies greater than those of Hysurf™ and the Micro-Lined® products, and with a lower pressure drop. These sheets have the further advantage of being unitary sheets produced by a much simpler process than the multi-step process required to produce pulp-based Hysurf™ sheet material. The charged sheet of Example 19 had filtration efficiencies equivalent to that of the 3M Filtrete™ product with somewhat higher pressure drop.

Examples 20-26

(Through-Air Bonded Sheets)

In Examples 20 through 26, unbonded flash-spun polyethylene sheets of the invention produced over a range of different flash-spinning temperatures and polymer concentrations, as described above, were through-air bonded according to the process described above with regard to FIG. 4. During the through-air bonding process, the sheets of open scrim material were left on both sides of the plexifilamentary sheet sample. The through-air bonding was done on a perforated drum unit like that shown in FIG. 4, having a drum diameter of 1.4 meters and a perforated section width (vacuum width)

of 0.5 meters. The unbonded sheets rotated about 300° around the perforated drum at a line speed of 15 m/min. The bonding air was heated to the temperatures shown in Table 5. The heated air was passed through the sheet at a rate of about 0.5 to 2 m/sec during the time it took the sheet to travel around the bonding drum. Spinning and bonding conditions for the sheets, and sheet properties are reported in Table 5 below.

TABLE 5

Properties of Through-Air Bonded Sheets

| Example | 20 | 21 | 22 | 23 | 24 |
|---|---|---|---|---|---|
| Spinning Conditions: | | | | | |
| Letdown Pressure (psi) | 1280 | 1480 | 1270 | 1575 | 1500 |
| Spinning Temperature (° C.) | 208 | 220 | 209 | 221 | 210 |
| Polymer Concentration (wt %) | 16 | 16.3 | 22 | 16 | 22 |
| Screens | 7 × 50 | 7 × 50 | 7 × 50 | — | — |
| Spin Orifice L/D | 4/1 | Std | 4/1 | 4/1 | Std |
| Letdown Entrance Angle | 23.6 | 23.6 | 23.6 | 60 | 15 deg |
| Tunnel | no rad | No rad | no rad | no rad | Rad |
| Polymer Flow Rate (lb/hr) | 49.05 | 47.5 | 61.1 | 55.9 | — |
| Web Properties: | | | | | |
| Denier | 238 | 255 | 402 | 370 | 244 |
| Surface Area (m$^2$/g) | 6.6 | 4.19 | 2.81 | 1.09 | 6.3 |
| Modulus (g/denier) | 16.7 | 9.7 | 8.1 | 3.0 | 30.7 |
| Tenacity (g/denier) | 4.1 | 2.76 | 2.68 | 1.48 | 6.04 |
| Elongation (%) | 68.2 | 34 | 56 | 73 | 33.0 |
| Sheet Properties (Unbonded): | | | | | |
| Basis Weight (oz/yd$^2$) | 1.48 | 1.3 | 1.26 | 2.5 | 1.64 |
| Gurley Hill (sec) | 0.0 | 0.4 | 0.0 | 0.0 | 0.65 |
| Actual Frazier (cfm/ft$^2$) | 9.6 | 28.3 | 43.5 | 58.5 | 10.0 |
| Frazier (normalized to 1.0 oz/yd$^2$ BW) (cfm/ft$^2$) | 14.2 | 36.8 | 54.8 | 146.3 | 16.4 |
| Hydrostatic Head (cm) | 83.0 | 58.2 | 48.3 | 34.1 | 86.4 |
| MVTR-LYSSY (g/m$^2$/day) | 2078 | 2339 | 2237 | 2273 | 2520 |
| TAB Conditions: | | | | | |
| Air Temperature (° C.) | 130 | 130 | 130 | 130 | 135-140 |
| Sheet Properties (TAB) | | | | | |
| Basis Weight (oz/yd$^2$) | 1.51 | 1.64 | 1.28 | 2.27 | 1.93 |
| Gurley Hill (sec) | 0.5 | 0.0 | 0.0 | 0.4 | ? |
| Actual Frazier (cfm/ft$^2$) | 17.6 | 40.5 | 43.4 | 26.9 | 8.1 |
| Frazier (normalized to 1.0 oz/yd$^2$** BW) (cfm/ft$^2$) | 26.6 | 66.4 | 55.6 | 61.1 | 15.6 |
| Hydrostatic Head (cm) | 77.0 | 45.7 | 45.9 | 48.0 | 122.9 |
| MVTR-LYSSY (g/m$^2$/day) | 2767 | 2499 | 2901 | 2547 | — |
| Mullenburst (psi) | 81 | 52 | — | — | — |
| Mean pore size (μm) | 13.3 | — | — | — | 9.4 |
| Maximum pore size (μm) | 19.5 | — | — | — | 11.8 |
| Ratio Max/Mean Pore Size | 1.5 | — | — | — | 1.3 |

Through-air bonding can be applied to the plexifilamentary sheet of the invention because the plexifilamentary sheet of the invention has greatly improved air permeability. In the past, it has not been possible to apply though air bonding to flash-spun plexifilamentary sheets because the air permeability of unbonded plexifilamentary sheet was too low for application of through-air bonding. The through-air bonded sheets of the invention exhibit extraordinarily high Frazier Air Permeability while maintaining a very high degree of liquid barrier (hydrostatic head). In addition the Mullenburst strength of the through-air bonded sheet is about twice as high as that of a full surface bonded sheet of the same plexifilamentary sheet material.

Examples 25-27

(Filtration Properties—Through-Air Bonded Sheets)

In Examples 25, 26 and 27, filtration properties were measured on the through-air bonded sheet of Examples 20, 21 and 24, respectively. The sheets of the invention tested in Examples 25-27 were not electrostatically charged. It is contemplated that the filtration performance of the through-air bonded sheets of the current invention can be improved by electrostatically charging the sheets. There are a number of well known methods that can be used for charging the sheets of the current invention to improve filtration performance. These known methods include, for example, thermal, liquid-contact, electron beam and corona discharge methods. A preferred method for electrostatically charging the sheets of the current invention is disclosed in Tsai et al. U.S. Pat. No. 5,401,446 which is assigned to the University of Tennessee. This method involves subjecting a material to a pair of electrical fields in which the electrical fields have opposite polarities.

For comparison purposes, the same filtration tests were conducted on three commercial filtration products: Hysurf™ sheet formed from flash-spun polyethylene plexifilamentary pulp; 3M's Filtrete™, an electrostatically charged spunbond-meltblown-spunbond laminate; and Micro-Lined® vacuum bag material sold by Home Care Industries, which is a combination of a paper outer shell with a polypropylene meltblown inner liner that has been electrostatically charged.

The filtration properties are given in Table 6 below.

TABLE 6

Air Filtration Efficiencies of Through-Air Bonded Samples

| Example | Velocity (cm/sec) | Pressure Drop (inches water) | Filtration Efficiency (0.3 µm) | Filtration Efficiency (0.966 µm) |
|---|---|---|---|---|
| 25 | 15 | 1.61 | 98.96 | 98.36 |
|  | 30 | 3.10 | 99.00 | 98.25 |
| 26 | 15 | 1.05 | 94.90 | 97.43 |
|  | 30 | 2.05 | 95.78 | 98.47 |
| 27 | 15 | 2.05 | 90.30 | 97.20 |
|  | 30 | 3.05 | 96.00 | 99.20 |
| HYSURF ™ | 15 | 2.09 | 81.80 | 98.00 |
|  | 30 | 4.20 | 90.20 | 98.50 |
| Filtrete ™ | 15 | 0.56 | 99.28 | 99.83 |
|  | 30 | 1.06 | 98.97 | 99.00 |
| Micro-Lined ® | 15 | 1.25 | 84.0 | 91.90 |
|  | 30 | 2.78 | 85.3 | 92.6 |

Example 28

(Softer Point-Bonded Sheets)

In this example, the sheet of the current invention was produced and bonded in a new way in order to obtain a softer sheet. The softness of the sheet was improved while maintaining high barrier and good breathability compared to conventional point-bonded flash-spun sheet.

The apparatus used in this example was a flash-spinning apparatus having inverted "V-shaped" baffles. Spin fluids were prepared by mixing the spin agent and high density polyethylene having a melt index of 0.70 g/10 min (measured according to ASTM D1238 at 190° C. and 2.16 kg load), a density of 0.958 g/cm$^3$, and a melting point of about 132° C. (Alathon®, obtained from Equistar Chemicals LP of Houston, Tex.) in a continuous mixing unit. The polyethylene contained 1000 parts per million by weight of the thermal stabilizer Fiberstab™ FS210. Fiberstab™ is a trademark of Ciba-Geigy Corporation. A blue pigment concentrate was added to the polyethylene. The blue pigment was Ampacet 560665 Blue Masterbatch made from a mixture of phthallocyanine blue pigment, phthallocyanine green pigment, and carbon black. The concentrate contained about 35% of the pigment in high density polyethylene. The concentrate and polymer were mixed to make a blend that was 2.5 weight percent concentrate and 97.5 weight percent polyethylene, based on the total weight of the blend, to provide an overall pigment concentration of about 0.85 weight percent, based on the total weight of polyethylene polymer and pigment blend.

Figure 8:
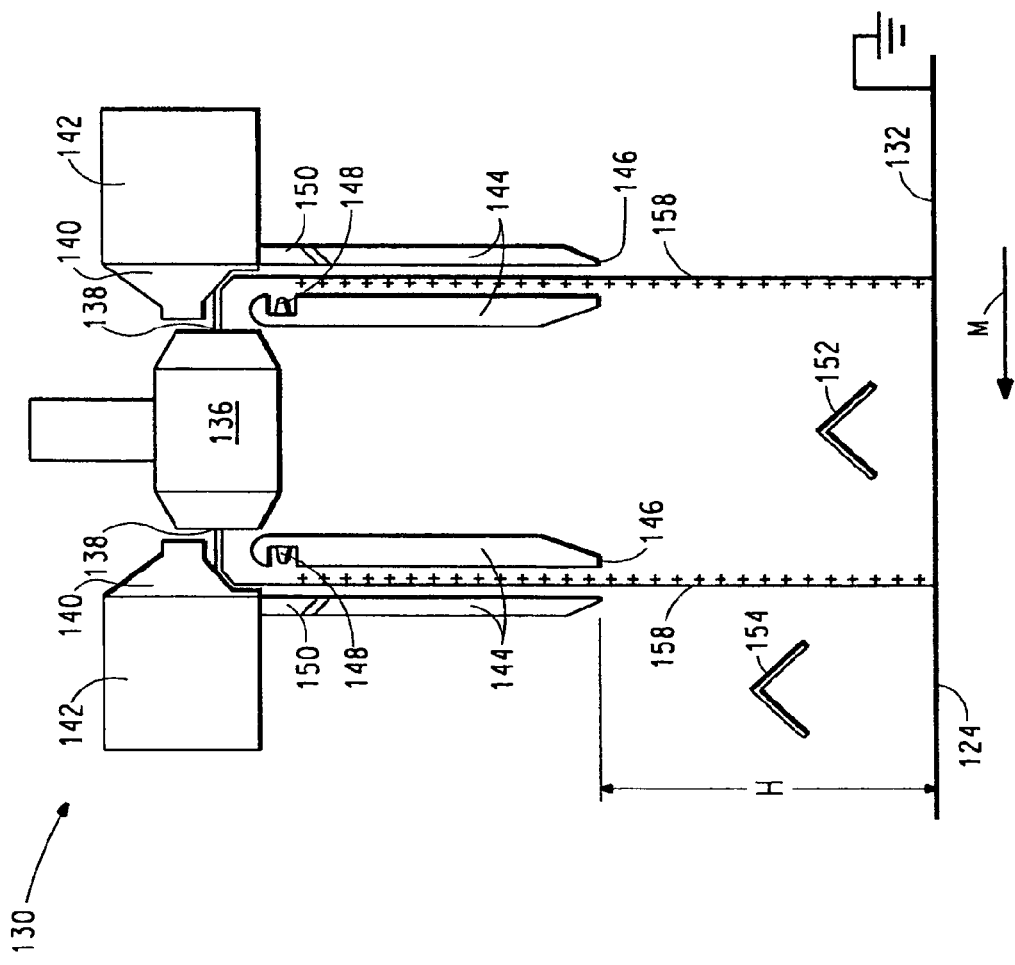
FIG. 8 is a cross-sectional schematic representation of a double-ended flash-spinning apparatus used for flash-spinning plexifilamentary sheet material.

The spin fluids were delivered through a heated transfer line to an array of three double-ended spinneret assemblies, each having two spin orifices. FIG. 8 shows a schematic representation of a single double-ended spinneret assembly 130 which comprises a spinneret pack 136 having a pair of spin orifices 138 at the exit end of each of two letdown chambers. A spin tunnel was located immediately downstream of each spin orifice and had the shape of a truncated cone with the diameter of the tunnel increasing away from the spin orifice. A small radius was used at the entrance section of the spin tunnel The spin tunnels direct gas and fibrous material onto internally housed rotating lobed baffles 140 driven by electric motors 142. The rotating baffles direct gas and fibrous material as a pair of laydown jets 158 downward towards collection belt 132, which is moving in direction M. The baffles cause the webs to be oscillated at about 135 Hz and a sheet having a width of about 50 cm was collected on the grounded moving bronze belt 132. The lay-down jets 158 are surrounded by aerodynamic shields (diffusers) 144 in order to protect the jets before they exit from issue points 146.

Each spinneret includes a corresponding electric charging ion gun 148 and metal target plate 150. The ion gun consisted of 23 charging needles located in two rows concentric with one another (with 12 needles in the first row spaced 10° on a 7.6 cm radius, and 11 needles in the second row spaced 10° on an 8.9 cm radius). Each of the needles was connected to a common direct current power source of 100 kV variable capacity, typically set at between 5 and 20 kV. The charging polarity was negative. The tips of the charging needles were located about 1.91 cm from the target plate surface. The target plate was connected to earth ground and had a diameter of 22.9 cm. After the plexifilamentary structure was electrically charged by passing between the ion gun and target plate, the plexifilamentary structure and the transporting gaseous spin agent were passed through the diffuser 144 which had an exit gap of about 0.635 cm and a radius of about 19.69 cm. The distance "H" from the center, bottom of the diffuser 144 to the surface of moving belt 132 was about 33 cm.

The gas management system used was like that described in U.S. Pat. No. 5,123,983 to Marshall, which is hereby incorporated by reference. As shown in FIG. 8, the gas management system comprised pack baffles 152 and positional baffles 154. The pack baffles 152 were located above the collection belt between the diffusers 144 of each double-ended spinneret assembly and were positioned closer to the upstream diffuser than the downstream diffuser and comprised an inverted "V-shaped" trough having a downstream leg shorter than the upstream leg. The positional baffles 154 were located halfway between adjacent double-ended spinneret assemblies and also comprised an inverted "V-shaped" trough open on each end. Spinning conditions are given below in Table 7.

The webs were collected on a moving belt in the absence of a support scrim, and were consolidated by passing the fibrous layer between the belt and a metal consolidation roll prior to exiting the spin cell and being collected on a take-up roll. The consolidated sheet was surface bonded on one side with a linen pattern and point bonded on the opposite side with a ribbed pattern according to the process described above with regard to Comparative Example B, except that the sheet was not collected on a scrim material, and that the following process conditions were used.

| Sheet speed during bonding | 450 fpm (137 m/min) |
|---|---|
| Linen surface bonding |  |
| roll temperature | 390° F. (199° C.) |
| nip pressure | 30 psig (20.7 N/cm$^2$) |
| roll wrap | 60 degrees (degrees of roll contact) |
| Ribbed point bonding |  |
| roll temperature | 330° F. (166° C.) |
| nip pressure | 25 psig (17.2 N/cm$^2$) |
| roll wrap | 35 degrees (degrees of roll contact) |

The bonding conditions were applied so as to produce a linen by rib bonding pattern with a lower percentage of linen surface bonded pattern and a higher percentage of ribbed point bonded pattern than has been used in conventional point-bonded flash spun sheet material. The point-bonded sheet was then softened according to the process described in U.S. Pat. No. 5,966,785. Web properties, unbonded and point-bonded sheet properties, and softened sheet properties are given in Table 7.

TABLE 7

| | |
|---|---|
| Spinning Conditions: | |
| Spinning Temperature (° C.) | 205 |
| Polymer Concentration (wt %) | 15.99 |
| Letdown Pressure (psi) | 1470 |
| Screens | None |
| Spin Orifice L/D | Cupped |
| Spin Tunnel | Rad |
| Entrance Angle (degrees) | 15 |
| Polymer Flow Rate (lb/hr) | 50.3 |
| Web Properties: | |
| Denier | 236 |
| Surface Area ($m^2/g$) | 7.07 |
| Modulus (g/denier) | 28.2 |
| Tenacity (g/denier) | 5.66 |
| Elongation (%) | 41.41 |
| Crush value (mm/g) | 1.69 |
| Sheet Properties (Unbonded): | |
| Basis Weight ($oz/yd^2$) | 1.17 |
| Gurley Hill (sec) | 2.8 |
| Actual Frazier ($cfm/ft^2$) | 2.24 |
| Frazier (normalized to 1.0 $oz/yd^2$ BW) ($cfm/ft^2$) | 2.62 |
| Hydrostatic Head (cm) | 83.08 |
| MVTR-LYSSY ($g/m^2$/day) | 18.03 |
| Sheet Properties (Point Bonded - Linen × Rib) (unsoftened): | |
| Basis Weight ($oz/yd^2$) | 1.34 |
| Percent linen bonded | 39.2 |
| Percent rib bonded | 60.8 |
| Gurley Hill (sec) | 4.77 |
| Actual Frazier ($cfm/ft^2$) | 0.322 |
| Frazier (normalized to 1.0 $oz/yd^2$ BW) ($cfm/ft^2$) | 0.431 |
| Hydrostatic Head (cm) | 159.2 |
| MVTR-LYSSY ($g/m^2$/day) | 1750 |
| Mullenburst (psi) | 57 |
| Sheet Properties (Point Bonded - Linen × Rib) (Softened & Treated): | |
| Basis Weight ($oz/yd^2$) | 1.26 |
| % Linen | 33.4 |
| % Rib | 66.6 |
| Gurley Hill (sec) | 4.5 |
| Actual Frazier ($cfm/ft^2$) | 0.716 |
| Frazier (normalized to 1.0 $oz/yd^2$ BW) ($cfm/ft^2$) | 0.902 |
| Hydrostatic Head (cm) | 152.4 |
| MVTR ($g/m^2$/day) | 1818 |
| Mullenburst (psi) | 48 |

| Softness (gm) (Softened and Treated) | actual | normalized (to 1 $oz/yd^2$) |
|---|---|---|
| MD (linen side) | 10.5 | 13.2 |
| MD (rib side) | 6.8 | 8.6 |
| CD (linen side) | 19.0 | 23.9 |
| CD (rib side) | 13.7 | 17.3 |

The foregoing description, drawings, and examples are intended to explain and describe the invention so as to contribute to the public base of knowledge. The scope of any patent rights granted on this application should be measured and determined by the claims that follow.

What is claimed:

1. A flash-spun plexifilamentary fiber strand having a surface area of less than 10 $m^2/g$ and a crush value of at least 1 mm/g.

2. The flash-spun plexifilamentary fiber strand of claim 1, wherein the surface area is less than 8 $m^2/g$.

3. The flash-spun plexifilamentary fiber strand of claim 1, wherein the surface area is less than 5 $m^2/g$.

4. The flash-spun plexifilamentary fiber strand of claim 1, wherein the crush value is at least 1.5 mm/g.

5. A nonwoven sheet comprising substantially continuous, flash-spun plexifilamentary fiber strands, the strands having surface areas of less than 10 $m^2/g$ and crush values of at least 1 mm/g.

6. The nonwoven sheet of claim 5 having a Frazier Permeability, normalized to 1.0 $oz/yd^2$ basis weight, of at least 2 $cfm/ft^2$.

7. The nonwoven sheet of claim 5 having a Gurley Hill Porosity of less than 6 seconds.

8. The nonwoven sheet of claim 6 having a hydrostatic head of at least 30 cm.

9. The nonwoven sheet of claim 6 having a hydrostatic head of at least 75 cm.

10. The nonwoven sheet of claim 6 having a hydrostatic head of at least 100 cm.

11. The nonwoven sheet of claim 6 having a hydrostatic head of at least 130 cm.

12. The nonwoven sheet of claim 5 having a Frazier Permeability, normalized to 1.0 $oz/yd^2$ basis weight, of at least 4 $cfm/ft^2$.

13. The nonwoven sheet of claim 5 having a Frazier Permeability, normalized to 1.0 $oz/yd^2$ basis weight, of at least 10 $cfm/ft^2$.

14. The nonwoven sheet of claim 5 having a Frazier Permeability, normalized to 1.0 $oz/yd^2$ basis weight, of at least 20 $cfm/ft^2$.

15. The nonwoven sheet of claim 5 having a Frazier Permeability, normalized to 1.0 $oz/yd^2$ basis weight, of at least 25 $cfm/ft^2$.

16. The nonwoven sheet of claim 5, wherein the sheet has a whole surface bonded portion of a first side of the sheet and a point bonded portion on the second side of the sheet, the point bonded portion of the sheet comprising at least 50% by weight of the nonwoven sheet.

17. The nonwoven sheet of claim 16, wherein the point bonded portion of the sheet comprises at least 60% by weight of the nonwoven sheet.

18. The nonwoven sheet of claim 17, wherein the point bonded portion to the sheet is bonded with a ribbed bonding pattern and the whole surface bonded portion of the sheet is bonded with a linen pattern.

19. A nonwoven sheet comprising substantially continuous, flash-spun plexifilamentary fiber strands and having a Frazier Permeability, normalized to 1.0 $oz/yd^2$ basis weight, of at least 2 $cfm/ft^2$.

20. The nonwoven sheet of claim 19 having a Frazier Permeability, normalized to 1.0 $oz/yd^2$ basis weight, of at least 4 $cfm/ft^2$.

21. The nonwoven sheet of claim 19 having a Frazier Permeability, normalized to 1.0 $oz/yd^2$ basis weight, of at least 10 $cfm/ft^2$.

22. The nonwoven sheet of claim 19 having a Frazier Permeability, normalized to 1.0 $oz/yd^2$ basis weight, of at least 20 $cfm/ft^2$.

23. The nonwoven sheet of claim 19 having a Frazier Permeability, normalized to 1.0 $oz/yd^2$ basis weight, of at least 25 $cfm/ft^2$.

24. The nonwoven sheet of claim 19 having a hydrostatic head of at least 30 cm.

25. The nonwoven sheet of claim 19 having a hydrostatic head of at least 85 cm.

26. The nonwoven sheet of claim 19 having a hydrostatic head of at least 130 cm.

27. The nonwoven sheet of claim 19 having a Gurley Hill Porosity of less than 6 seconds.

28. A garment comprised of the nonwoven sheet of claim 5 or 19.

29. A flash-spun plexifilamentary fiber strand having a surface area of less than 10 m$^2$/g.

30. The flash-spun plexifilamentary fiber strand of claim 29, wherein the surface area is less than 8 m$^2$/g.

31. The flash-spun plexifilamentary fiber strand of claim 29, wherein the surface area is less than 5 m$^2$/g.

32. A nonwoven sheet comprising substantially continuous, flash-spun plexifilamentary fiber strands, the strands having surface areas of less than 10 m$^2$/g.

33. The nonwoven sheet of claim 32 having a Frazier Permeability, normalized to 1.0 oz/yd$^2$ basis weight, of at least 2 cfm/ft$^2$.

34. The nonwoven sheet of claim 32 having a Gurley Hill Porosity of less than 6 seconds.

35. The nonwoven sheet of claim 33 having a hydrostatic head of at least 30 cm.

36. The nonwoven sheet of claim 33 having a hydrostatic head of at least 75 cm.

37. The nonwoven sheet of claim 33 having a hydrostatic head of at least 100 cm.

38. The nonwoven sheet of claim 33 having a hydrostatic head of at least 130 cm.

39. The nonwoven sheet of claim 32 having a Frazier Permeability, normalized to 1.0 oz/yd$^2$ basis weight, of at least 4 cfm/ft$^2$.

40. The nonwoven sheet of claim 32 having a Frazier Permeability, normalized to 1.0 oz/yd$^2$ basis weight, of at least 10 cfm/ft$^2$.

41. The nonwoven sheet of claim 32 having a Frazier Permeability, normalized to 1.0 oz/yd$^2$ basis weight, of at least 20 cfm/ft$^2$.

42. The nonwoven sheet of claim 32 having a Frazier Permeability, normalized to 1.0 oz/yd$^2$ basis weight, of at least 25 cfm/ft$^2$.

43. The nonwoven sheet of claim 32, wherein the sheet has a whole surface bonded portion of a first side of the sheet and a point bonded portion on the second side of the sheet, the point bonded portion of the sheet comprising at least 50% by weight of the nonwoven sheet.

44. The nonwoven sheet of claim 43, wherein the point bonded portion of the sheet comprises at least 60% by weight of the nonwoven sheet.

45. The nonwoven sheet of claim 44, wherein the point bonded portion to the sheet is bonded with a ribbed bonding pattern and the whole surface bonded portion of the sheet is bonded with a linen pattern.

46. A garment comprised of the nonwoven sheet of claim 32.

47. A flash-spun plexifilamentary fiber strand having a crush value of at least 1 mm/g.

48. The flash-spun plexifilamentary fiber strand of claim 47, wherein the crush value is at least 1.5 mm/g.

49. A nonwoven sheet comprising substantially continuous, flash-spun plexifilamentary fiber strands, the strands having crush value of at least 1 mm/g.

50. The nonwoven sheet of claim 49, the strands having crush value of at least 1.5 mm/g.

51. The nonwoven sheet of claim 49 having a Frazier Permeability, normalized to 1.0 oz/yd$^2$ basis weight, of at least 2 cfm/ft$^2$.

52. The nonwoven sheet of claim 49 having a Gurley Hill Porosity of less than 6 seconds.

53. The nonwoven sheet of claim 51 having a hydrostatic head of at least 30 cm.

54. The nonwoven sheet of claim 51 having a hydrostatic head of at least 75 cm.

55. The nonwoven sheet of claim 51 having a hydrostatic head of at least 100 cm.

56. The nonwoven sheet of claim 51 having a hydrostatic head of at least 130 cm.

57. The nonwoven sheet of claim 49 having a Frazier Permeability, normalized to 1.0 oz/yd$^2$ basis weight, of at least 4 cfm/ft$^2$.

58. The nonwoven sheet of claim 49 having a Frazier Permeability, normalized to 1.0 oz/yd$^2$ basis weight, of at least 10 cfm/ft$^2$.

59. The nonwoven sheet of claim 49 having a Frazier Permeability, normalized to 1.0 oz/yd$^2$ basis weight, of at least 20 cfm/ft$^2$.

60. The nonwoven sheet of claim 49 having a Frazier Permeability, normalized to 1.0 oz/yd$^2$ basis weight, of at least 25 cfm/ft$^2$.

61. The nonwoven sheet of claim 49, wherein the sheet has a whole surface bonded portion of a first side of the sheet and a point bonded portion on the second side of the sheet, the point bonded portion of the sheet comprising at least 50% by weight of the nonwoven sheet.

62. The nonwoven sheet of claim 61, wherein the point bonded portion of the sheet comprises at least 60% by weight of the nonwoven sheet.

63. The nonwoven sheet of claim 62, wherein the point bonded portion to the sheet is bonded with a ribbed bonding pattern and the whole surface bonded portion of the sheet is bonded with a linen pattern.

64. A garment comprised of the nonwoven sheet of claim 47.

* * * * *